(12) United States Patent
Tsuchiya

(10) Patent No.: US 11,816,938 B2
(45) Date of Patent: Nov. 14, 2023

(54) INFORMATION PRESENTATION SYSTEM, SERVER, INFORMATION PRESENTATION METHOD, AND INFORMATION PRESENTATION DEVICE

(71) Applicant: Toyota Jidosha Kabushiki Kaisha, Toyota (JP)

(72) Inventor: Yoshiyuki Tsuchiya, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 378 days.

(21) Appl. No.: 17/179,877

(22) Filed: Feb. 19, 2021

(65) Prior Publication Data

US 2021/0295619 A1    Sep. 23, 2021

(30) Foreign Application Priority Data

Mar. 23, 2020    (JP) ................. 2020-051052

(51) Int. Cl.

| | |
|---|---|
| *G07C 5/08* | (2006.01) |
| *B60L 55/00* | (2019.01) |
| *B60L 53/62* | (2019.01) |
| *B60L 53/16* | (2019.01) |
| *B60L 53/63* | (2019.01) |
| *G07C 5/00* | (2006.01) |
| *G07C 5/04* | (2006.01) |

(52) U.S. Cl.
CPC ............ *G07C 5/0816* (2013.01); *B60L 53/16* (2019.02); *B60L 53/62* (2019.02); *B60L 53/63* (2019.02); *B60L 55/00* (2019.02); *G07C 5/008* (2013.01); *G07C 5/04* (2013.01)

(58) Field of Classification Search
CPC ........ G07C 5/0816; G07C 5/008; G07C 5/04; B60L 55/00; B60L 53/62; B60L 53/16; B60L 53/63
See application file for complete search history.

(56) References Cited

U.S. PATENT DOCUMENTS 11,413,984 B2 *   8/2022   Yang ................ B60L 58/12
2009/0144150 A1 * 6/2009   Sakakibara ........... G06Q 50/06
                                                                     705/14.62

(Continued)

FOREIGN PATENT DOCUMENTS

| JP | 2013-084199 A | 5/2013 |
|---|---|---|
| JP | 2015-032286 A | 2/2015 |
| WO | 2012063606 A1 | 5/2012 |

*Primary Examiner* — Gertrude Arthur Jeanglaude
(74) *Attorney, Agent, or Firm* — Dinsmore & Shohl LLP

(57) ABSTRACT

An information presentation system includes an electric vehicle, the electric vehicle including an electrical storage device and being configured to perform either or both of external charging in which the electrical storage device is charged with electric power supplied from an outside of the electric vehicle and external power feeding in which electric power is supplied from the electrical storage device to the outside, wherein: a user of the electric vehicle is evaluated using information acquired from the electric vehicle; an evaluation result is sent to the user that has been evaluated; and the evaluation result includes either or both of first evaluation information indicating how high a score of the user for the external charging is and second evaluation information indicating how high a score of the user for the external power feeding is.

14 Claims, 10 Drawing Sheets

(56) References Cited

U.S. PATENT DOCUMENTS

| | | |
|---|---|---|
| 2013/0317690 A1 | 11/2013 | Fujita et al. |
| 2018/0272881 A1 | 9/2018 | Kojima |
| 2018/0272884 A1* | 9/2018 | Kojima ................ B60L 53/665 |
| 2018/0339601 A1* | 11/2018 | Kruszelnicki ........... B60L 53/16 |
| 2022/0410759 A1* | 12/2022 | Nakada ................. G06Q 50/10 |

* cited by examiner

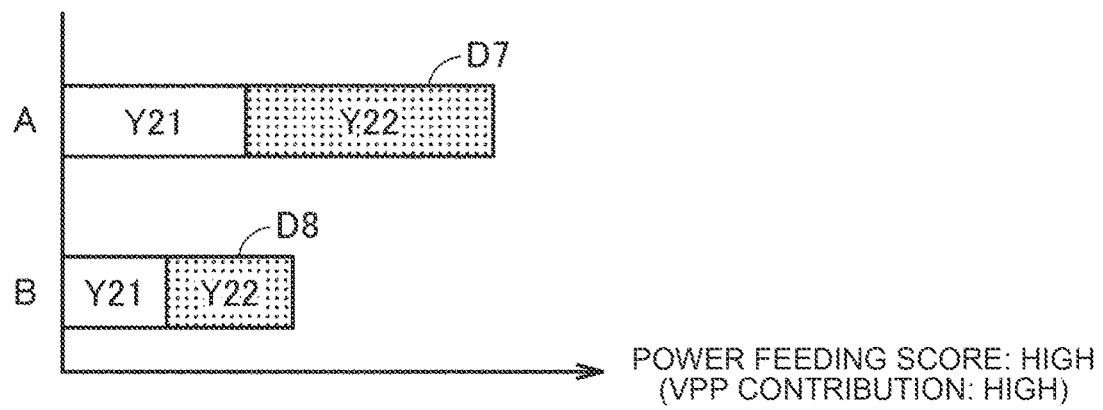

FIG. 9

| HISTORY | EVALUATION PERIOD | NUMBER OF EVENTS ||||| AMOUNT OF ELECTRICAL ENERGY || FULL CHARGE STANDING TIME | ELECTRICITY CHARGES | VPP INCENTIVES |
|---|---|---|---|---|---|---|---|---|---|---|
| | | TOTAL | QUICK | TIMER | COOLING ON | VPP | TOTAL | VPP | | | |
| CHARGING | 1/1/20XX TO PRESENT | 50 | 10 | 15 | 45 | 5 | **kWh | **kWh | **h | ** | ** |
| POWER FEEDING | 1/1/20XX TO PRESENT | 3 | – | – | 3 | 1 | **kWh | **kWh | **h | – | ** |

| EVALUATION RESULTS | EVALUATION PERIOD | BATTERY DEGRADATION ||| VPP CONTRIBUTION |||
|---|---|---|---|---|---|---|---|
| | | SCORE | RANK ||  SCORE | RANK ||
| | | | OVERALL | VEHICLE MODEL | | OVERALL | VEHICLE MODEL |
| CHARGING | 1/1/20XX TO PRESENT | 1500 | 25 | 1 | 500 | 50 | 3 |
| POWER FEEDING | 1/1/20XX TO PRESENT | 300 | 70 | 5 | 200 | 120 | 10 |
| IMPROVEMENT PLAN | ****** | | | | | | |

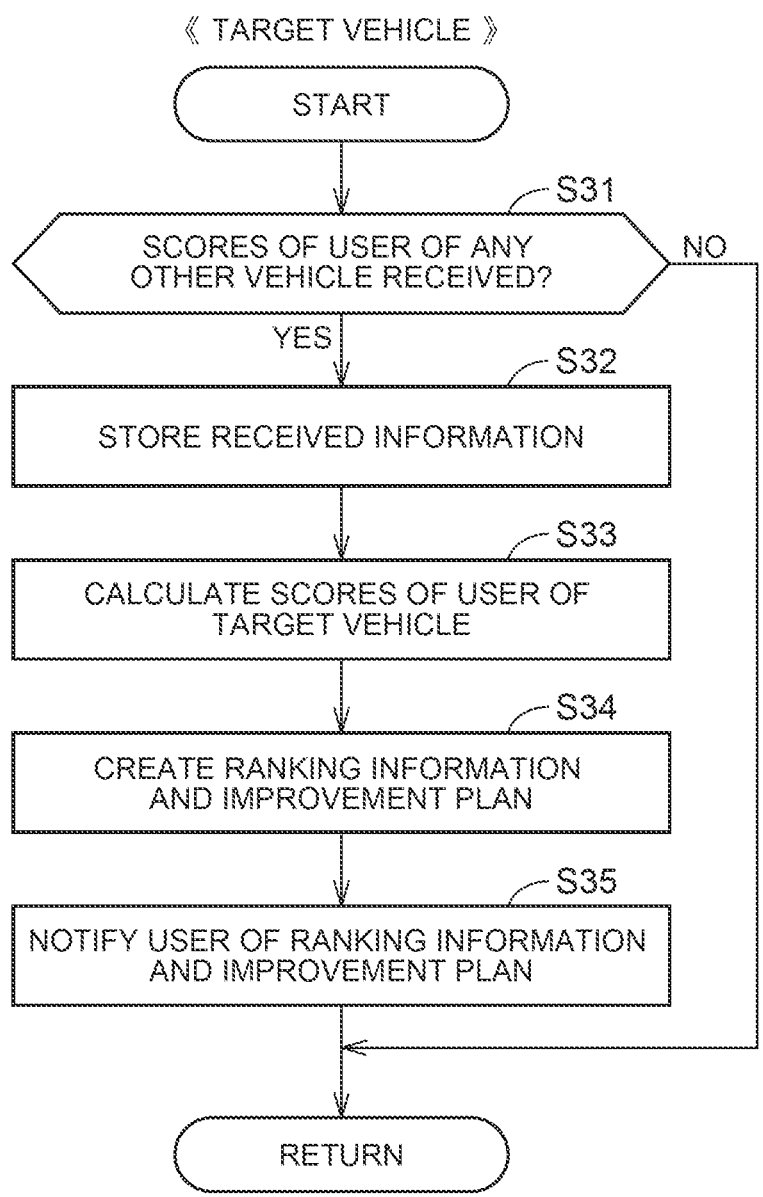

INFORMATION PRESENTATION SYSTEM, SERVER, INFORMATION PRESENTATION METHOD, AND INFORMATION PRESENTATION DEVICE

CROSS-REFERENCE TO RELATED APPLICATION

This application claims priority to Japanese Patent Application No. 2020-051052 filed on Mar. 23, 2020, incorporated herein by reference in its entirety.

BACKGROUND

1. Technical Field

The present disclosure relates to information presentation systems, servers, information presentation methods, and information presentation devices.

2. Description of Related Art

For example, WO 2012/063606 discloses an information presentation device that diagnoses a history of the state of use of a secondary battery mounted on a vehicle and presents a measure to reduce battery degradation. This information presentation device determines whether to allow or prohibit presentation of an alternative measure to reduce battery degradation, based on whether the alternative measure impairs functions as a vehicle.

SUMMARY

The information presentation device described in the above WO 2012/063606 does not present an alternate measure to reduce battery degradation which has been determined to impair functions as a vehicle. However, not all the users necessarily desire limitation on presentation of information.

For example, electric vehicles are known which perform external charging and external power feeding. The electric vehicles are vehicles configured to run on electric power stored in an electrical storage device mounted thereon. External charging refers to charging the electrical storage device of the vehicle with electric power supplied from the outside of the vehicle. External power feeding refers to supplying electric power from the electrical storage device of the vehicle to the outside of the vehicle.

Some users of the electric vehicles desire to determine themselves whether to make an improvement in the current way of performing external charging and/or external power feeding based on the knowledge that whether the current way of performing external charging and/or external power feeding is good or bad. The above WO 2012/063606 gives no consideration to such users and has room for improvement.

The present disclosure provides an information presentation system, a server, an information presentation method, and an information presentation device that can notify a user of whether the way of performing external charging and/or external power feeding is good or bad.

An information presentation system according to a first aspect of the present disclosure includes: an electric vehicle, the electric vehicle including an electrical storage device and being configured to perform either or both of external charging in which the electrical storage device is charged with electric power supplied from an outside of the electric vehicle and external power feeding in which electric power is supplied from the electrical storage device to the outside, wherein: a user of the electric vehicle is evaluated using information acquired from the electric vehicle; an evaluation result is sent to the user that has been evaluated; and the evaluation result includes either or both of first evaluation information indicating how high a score of the user for the external charging is and second evaluation information indicating how high a score of the user for the external power feeding is.

A server according to a second aspect of the present disclosure includes: a processor configured to: evaluate each of users of a plurality of electric vehicles using information acquired from each of the electric vehicles; and send evaluation results to each of the users that has been evaluated, wherein each of the electric vehicles includes an electrical storage device and is configured to perform either or both of external charging in which the electrical storage device is charged with electric power supplied from an outside each of the electric vehicles and external power feeding in which electric power is supplied from the electrical storage device to the outside, and the evaluation results include either or both of first evaluation information indicating how high a score of the user for the external charging is and second evaluation information indicating how high a score of the user for the external power feeding is.

An information presentation method according to a third aspect of the present disclosure includes: evaluating by a processor each of users of a plurality of electric vehicles using information acquired from each of the electric vehicles; and sending evaluation results from the processor to each of the users that has been evaluated, wherein each of the electric vehicles includes an electrical storage device and is configured to perform either or both of external charging in which the electrical storage device is charged with electric power supplied from an outside of each of the electric vehicles and external power feeding in which electric power is supplied from the electrical storage device to the outside, and the evaluation results include either or both of first evaluation information indicating how high a score of the user for the external charging is and second evaluation information indicating how high a score of the user for the external power feeding is.

Each of the information presentation system, the server, and the information presentation method can send either or both of the first evaluation information and the second evaluation information to the user. Accordingly, the user can know whether the way of performing the external charging and/or the external power feeding is good or bad by referring to the received information.

Each of the first evaluation information and the second evaluation information indicates how high the score is. In the above aspect, the score may be represented by at least one of the number of points, a predetermined category, and a rank in a predetermined group including a plurality of the users.

The user can check whether the current score has increased or decreased from the past score by periodically receiving either or both of the first evaluation information and the second evaluation information. When the scores are shown in descending order, the user can check whether his or her way of performing the external charging and/or the external power feeding is good or bad as compared to other users.

Sending either or both of the first evaluation information and the second evaluation information to the user includes at least one of sending either or both of the first evaluation information and the second evaluation information to communication equipment mounted on a vehicle used by the user and sending either or both of the first evaluation information and the second evaluation information to a mobile terminal carried by the user.

A criterion for determining the score (good or bad) may be set as desired by a system administrator or the user. For example, in the above aspect, the evaluation result may include the first evaluation information; and the first evaluation information may indicate a score that is higher for the user who performs the external charging while giving more consideration to a life of the electrical storage device. Either or both of the first evaluation information and the second evaluation information may indicate a score that is higher for the user whose contribution to balancing of supply and demand on a power network is greater.

In the above aspect, the evaluation result may include the first evaluation information; the first evaluation information may indicate scoring of a user's way of performing the external charging according to a plurality of criteria; and the criteria may include either or both of degradation of the electrical storage device due to the external charging and contribution to balancing of supply and demand on a power network by the external charging.

According to the above configuration, the user can be notified of the results of evaluating whether the way of performing the external charging is good or bad from a plurality of perspectives.

According to the above configuration, the user can be notified of the results of evaluating whether the way of performing the external power feeding is good or bad from a plurality of perspectives.

In the above aspect, the score of each of users of a plurality of the electric vehicles for the external charging may be calculated using history information acquired from each of the electric vehicles; the users of the electric vehicles may be ranked in descending or ascending order of the calculated score; and the first evaluation information indicating at least a rank of the user among the users who have been ranked may be sent to the user of the electric vehicle.

According to the above configuration, the user can check whether his or her way of performing the external charging is good or bad as compared to other users.

In the above aspect, the score of each of users of a plurality of the electric vehicles for the external power feeding may be calculated using history information acquired from each of the electric vehicles; the users of the electric vehicles may be ranked in descending or ascending order of the calculated score; and the second evaluation information indicating at least a rank of the user among the users who have been ranked may be sent to the user of the electric vehicle.

According to the above configuration, the user can check whether his or her way of performing the external power feeding is good or bad as compared to other users.

An information presentation device according to a fourth aspect of the present disclosure includes: a processor configured to: send history information of an electric vehicle to an outside of the information presentation device; receive information indicating how high a score calculated using the history information is; and output, by using the received information, either or both of first evaluation information indicating how high a score of a user for external charging is and second evaluation information indicating how high a score of the user for external power feeding is.

According to the above aspect, the information presentation device can present either or both of the first evaluation information and the second evaluation information to the user. Accordingly, the user can know whether the way of performing the external charging and/or the external power feeding is good or bad according to the received information.

An information presentation device according to a fifth aspect of the present disclosure includes: a processor configured to: calculate a score of a user of a target vehicle using history information of the target vehicle, the target vehicle being an electric vehicle; send the score of the user of the target vehicle to an outside of the information presentation device; receive scores of users of other vehicles that are electric vehicles other than the target vehicle; and output a rank of the user of the target vehicle regarding either or both of a way of performing external charging and a way of performing external power feeding by using the score of the user of the target vehicle and the scores of the users of the other vehicles.

According to the above information presentation device, the user can check whether his or her way of performing the external charging and/or the external power feeding is good or bad as compared to other users.

According to the present disclosure, the information presentation system, the server, the information presentation method, and the information presentation device are provided which can notify a user of whether the way of performing external charging and/or external power feeding is good or bad.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 illustrates a scoring method for a power feeding score Y according to the embodiment of the present disclosure;

FIG. 8 illustrates an example of a ranking list that is created by the information presentation system according to the embodiment of the present disclosure;

FIG. 9 illustrates an example of evaluation results that are notified to a user by the information presentation system according to the embodiment of the present disclosure;

FIG. 13 is a flowchart of an information presentation method that is performed by the vehicle control device shown in FIG. 12.

DETAILED DESCRIPTION OF EMBODIMENTS

An embodiment of the present disclosure will be described in detail with reference to the accompanying drawings. The same or corresponding portions are denoted with the same signs throughout the drawings, and description thereof will not be repeated.

An information presentation system according to the embodiment includes a plurality of electric vehicles. The electric vehicles in the information presentation system may have different configurations from each other. However, it is assumed in the embodiment that each electric vehicle in the information presentation system has a configuration shown in FIG. 1. Hereinafter, each of the electric vehicles included in the information presentation system is referred to as the "vehicle 50" and each of a plurality of EVSEs included in the information presentation system is referred to as the "EVSE 40" unless individually identified. EVSE stands for electric vehicle supply equipment.

Figure 1:
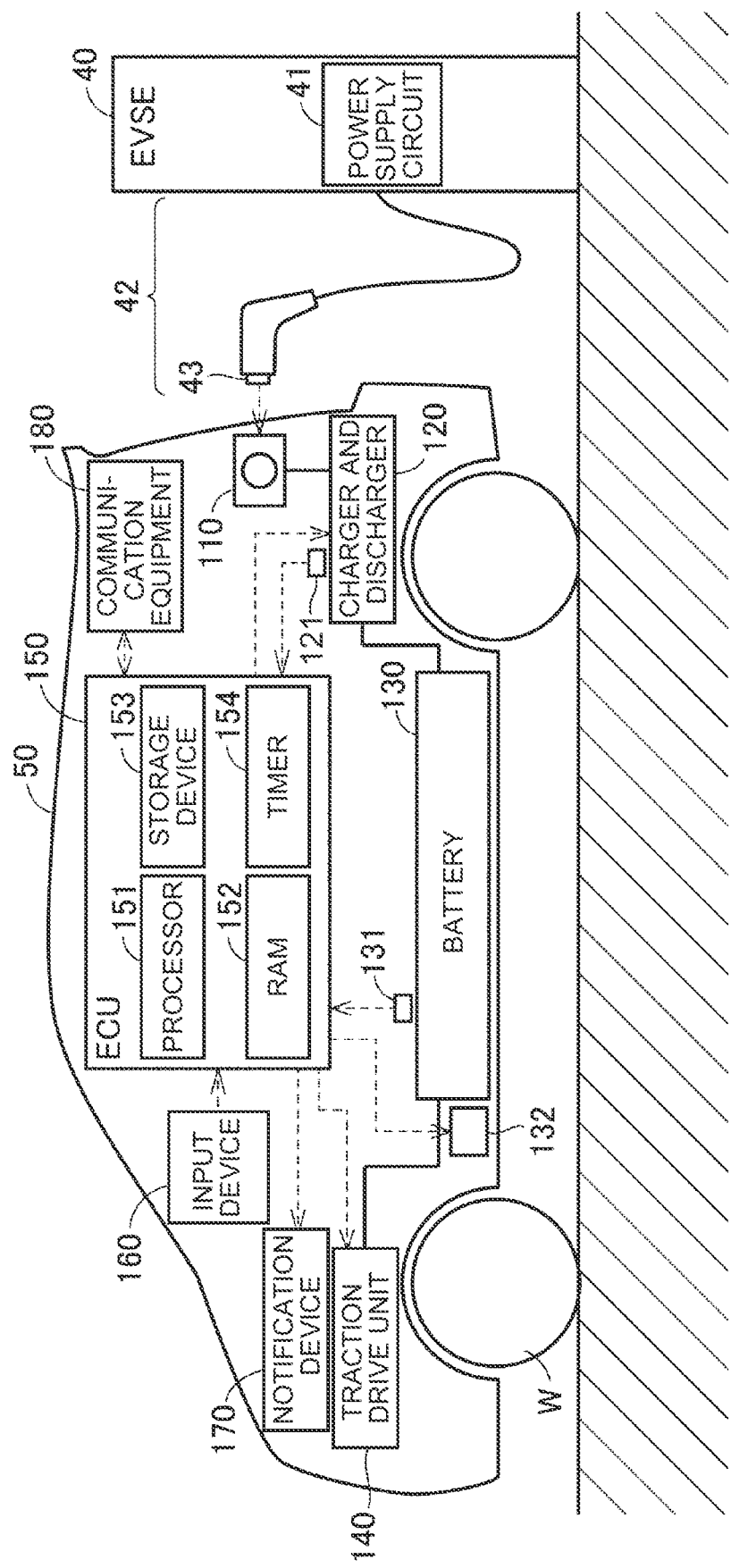
FIG. 1 illustrates the configuration of a vehicle included in an information presentation system according to an embodiment of the present disclosure.

FIG. 1 illustrates the configuration of the vehicle 50 included in the information presentation system according to the embodiment. Referring to FIG. 1, the vehicle 50 includes a battery 130 that stores electric power for traction. The battery 130 includes a secondary battery such as, e.g., a lithium ion battery or a nickel-metal hydride battery. In the embodiment, the secondary battery is a battery pack including a plurality of lithium ion cells. The battery pack is comprised of a plurality of single cells (typically referred to as "cells") electrically connected to each other. Other electrical storage devices such as an electric double layer capacitor may be used instead of the secondary battery. The vehicle 50 and the battery 130 according to the embodiment are an example of the "electric vehicle" and an example of the "electrical storage device" according to the present disclosure, respectively.

The vehicle 50 includes an electronic control unit (ECU) 150. The ECU 150 is configured to perform charge control and discharge control for the battery 130. The ECU 150 is also configured to control communication of the vehicle 50 with the outside. The vehicle 50 may be either an electric vehicle (EV) that can run only on electric power stored in the battery 130 or a plug-in hybrid vehicle (PHV) that can run on both electric power stored in the battery 130 and output of an engine (not shown). In the embodiment, the vehicle 50 is driven by a user. However, the vehicle 50 may be configured to drive autonomously.

The vehicle 50 further includes a monitoring module 131 that monitors the state of the battery 130. The monitoring module 131 includes various sensors that detect the state of the battery 130 (e.g., voltage, current, and temperature). The monitoring module 131 outputs the detection results to the ECU 150. The ECU 150 can acquire the state of the battery 130 (e.g., temperature, current, voltage, state of charge (SOC), and internal resistance) based on the output of the monitoring module 131 (i.e., the detection values of the various sensors).

The vehicle 50 further includes a cooling device 132 that cools the battery 130. In the embodiment, the cooling device 132 is an air moving device such as a fan or a blower. However, the present disclosure is not limited to this, and the cooling device 132 may be configured to cool the battery 130 by circulating a cooling medium around the battery 130. The cooling method may be either water cooling or air cooling.

The vehicle 50 further includes an inlet 110 and a charger and discharger 120 that are compatible with the power supply method of the EVSE 40. The inlet 110 is configured to receive electric power supplied from the outside of the vehicle 50. The inlet 110 is also configured to output to the outside of the vehicle 50 electric power supplied from the charger and discharger 120. Although FIG. 1 shows only the inlet 110 and the charger and discharger 120, the vehicle 50 may include a plurality of inlets and a plurality of chargers and dischargers, one each for each power supply method, so that the vehicle 50 is compatible with a plurality of power supply methods (e.g., an alternating current (AC) method and a direct current (DC) method).

The EVSE 40 includes a power supply circuit 41. A charging cable 42 is connected to the EVSE 40. The charging cable 42 may always be connected to the EVSE or may be detachable from the EVSE 40. The charging cable 42 has a connector 43 at its tip end and includes a power line therein. The connector 43 of the charging cable 42 can be connected to the inlet 110. The EVSE 40 and the vehicle 50 are electrically connected by connecting the connector 43 of the charging cable 42 connected to the EVSE to the inlet 110 of the vehicle 50. Electric power can thus be supplied from the EVSE to the vehicle 50 through the charging cable 42.

The charger and discharger 120 is located between the inlet 110 and the battery 130. The charger and discharger 120 includes a relay that connects and disconnects an electric power path from the inlet 110 to the battery 130 and a power conversion circuit (e.g., a bidirectional converter) (both not shown). The ECU 150 controls the relay and the power conversion circuit that are included in the charger and discharger 120. The vehicle 50 further includes a monitoring module 121 that monitors the state of the charger and discharger 120. The monitoring module 121 includes various sensors that detect the state of the charger and discharger 120 (e.g., voltage, current, and temperature). The monitoring module 121 outputs the detection results to the ECU 150. In the embodiment, the monitoring module 121 is configured to detect the voltage and current that are input to the power conversion circuit and the voltage and current that are output from the power conversion circuit.

Electric power can be transferred between the EVSE 40 and the vehicle 50 when the EVSE 40 located outside the vehicle 50 and the inlet 110 are connected via the charging cable 42. The vehicle 50 can thus perform external charging (that is, the battery 130 of the vehicle 50 can be charged with electric power supplied from the outside of the vehicle 50). The electric power for external charging is supplied from, e.g., the EVSE 40 to the inlet 110 through the charging cable 42. The charger and discharger 120 is configured to convert the electric power received by the inlet 110 to electric power suitable for charging the battery 130 and output the converted electric power to the battery 130. The vehicle 50 can also perform external power feeding (that is, electric power can be supplied from the vehicle 50 to the EVSE 40 via the charging cable 42) when the EVSE 40 and the inlet 110 are connected via the charging cable 42. The electric power for external power feeding is supplied from the battery 130 to the charger and discharger 120. The charger and discharger 120 is configured to convert the electric power supplied from the battery 130 to electric power suitable for external power feeding and output the converted electric power to the inlet 110. The relay of the charger and discharger 120 is closed (connected) when the vehicle 50 performs either external charging or external power feeding. The relay of the charger and discharger 120 is opened (disconnected) when the vehicle 50 performs neither external charging nor external power feeding.

The configuration of the charger and discharger 120 is not limited to the above configuration and may be modified as appropriate. The charger and discharger 120 may include, e.g., at least one of a rectifier circuit, a power factor correction (PFC) circuit, an isolation circuit (e.g., an isolation transformer), an inverter, and a filter circuit. In the case where the vehicle 50 supplies electric power to an AC EVSE, the charger and discharger 120 may convert DC power discharged from the battery 130 to AC power and this AC power may be supplied from the vehicle 50 to the EVSE. In the case where the vehicle 50 supplies electric power to a DC EVSE, the vehicle 50 may supply DC power to the EVSE and an inverter included in the EVSE may convert the DC power to AC power. The DC EVSE standard may be CHAdeMO, Combined Charging System (CCS), GB/T, or Tesla.

The ECU 150 includes a processor 151, a random access memory (RAM) 152, a storage device 153, and a timer 154. The processor 151 is, e.g., a central processing unit (CPU). The RAM 152 functions as a working memory for temporarily storing data to be processed by the processor 151. The storage device 153 is configured to save stored information. The storage device 153 includes, e.g., a read only memory (ROM) and a rewritable nonvolatile memory. The storage device 153 has stored therein programs and information to be used by the programs (e.g., maps, numerical formulas, and various parameters). In the embodiment, various controls in the ECU 150 are performed by the processor 151 executing the programs stored in the storage device 153. However, the various controls in the ECU 150 need not necessarily be performed by software, and may be performed by dedicated hardware (an electronic circuit). The ECU 150 may include any number of processors. The ECU 150 may include processors, one for each predetermined control.

The timer 154 is configured to notify the processor 151 when it is a set time. When the time set on the timer 154 comes, the timer 154 sends to the processor 151 a signal notifying that the set time has come. In the embodiment, the timer 154 is a timer circuit. However, the timer 154 may be implemented by software instead of hardware (a timer circuit). The ECU 150 can acquire the current time using a real-time clock (RTC) circuit (not shown) included in the ECU 150.

The vehicle 50 further includes a traction drive unit 140, an input device 160, a notification device 170, communication equipment 180, and drive wheels W. The vehicle 50 is not limited to front-wheel drive shown in FIG. 1, and may be rear-wheel drive or four-wheel drive.

The traction drive unit 140 includes a power control unit (PCU) and a motor generator (MG), both not shown, and is configured to drive the vehicle 50 using the electric power stored in the battery 130. The PCU includes: e.g., a control device including a processor; an inverter; a converter; and a relay (hereinafter referred to as the "system main relay (SMR)") (none of which are shown). The control device of the PCU is configured to receive instructions (control signals) from the ECU 150 and control the inverter, the converter, and the SMR of the PCU according to the instructions. The MG is, e.g., a three-phase AC motor generator. The MG is configured to be driven by the PCU and rotate the drive wheels W. The MG is also configured to regeneratively generate electric power and supply the generated electric power to the battery 130. The SMR is configured to connect and disconnect an electric power path from the battery 130 to the PCU. The SMR is closed (connected) when the vehicle 50 is traveling.

The input device 160 is a device that receives input from the user. The input device 160 is operated by the user and outputs signals corresponding to the user's operation to the ECU 150. The communication may be either wired or wireless. Examples of the input device 160 include various switches, various pointing devices, a keyboard, and a touch panel. The input device 160 may be an operation unit of a car navigation system. The input device 160 may be a smart speaker that receives voice input.

The notification device 170 is configured to perform a predetermined notification process to give notifications to the user (e.g., an occupant of the vehicle 50) as requested by the ECU 150. The notification device 170 may include at least one of a display device (e.g., a touch panel display), a speaker, and a lamp (e.g., a malfunction indicator lamp (MIL)). The notification device 170 may be a meter panel, a head-up display, or a car navigation system.

The communication equipment 180 includes various communication interfaces (I/Fs). The communication equipment 180 may include a Data Communication Module (DCM). The communication equipment 180 may include a communication I/F compatible with the fifth generation mobile communication system (5G). The ECU 150 is configured to wirelessly communicate with a communication device outside the vehicle 50 via the communication equipment 180.

Figure 2:
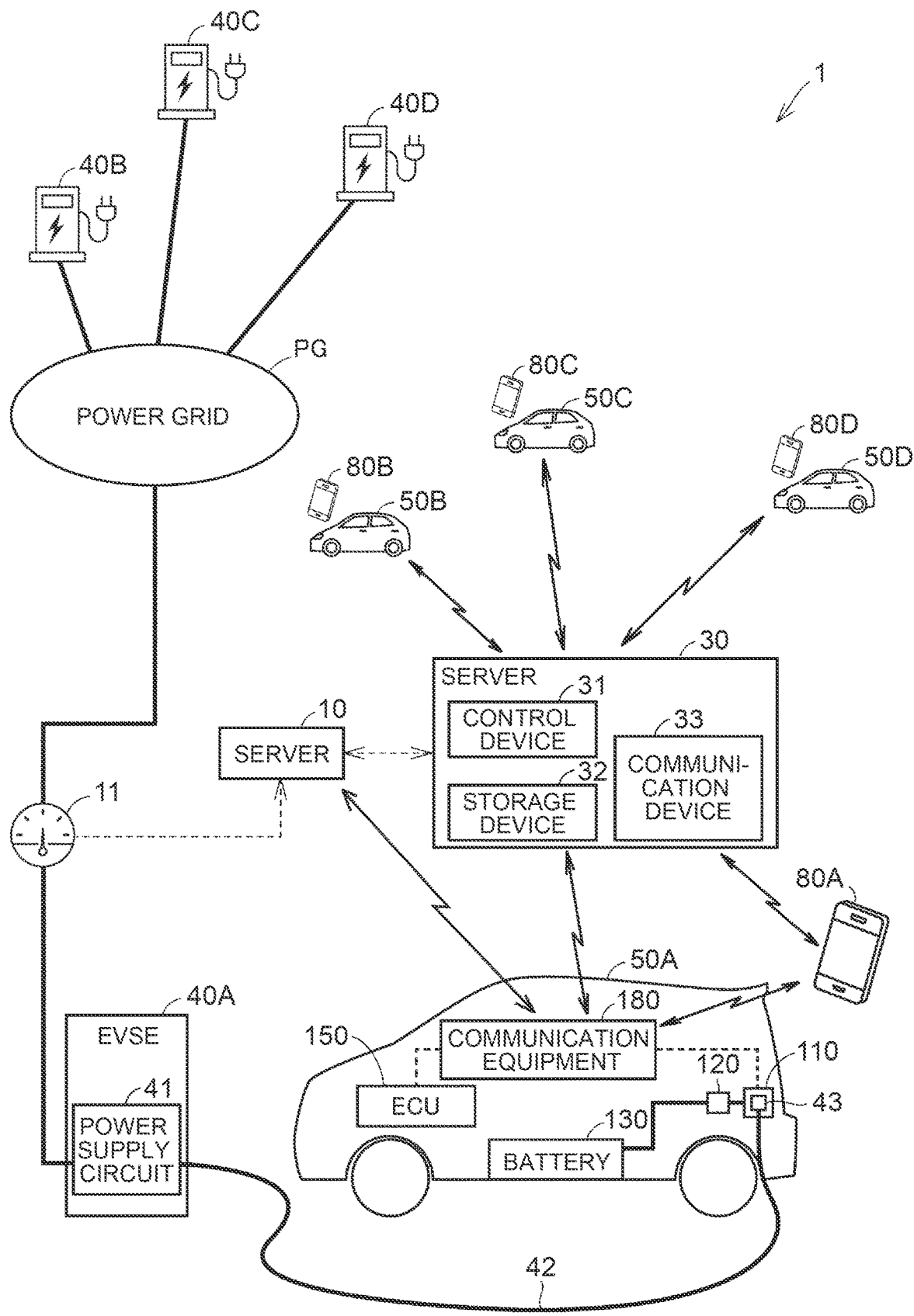
FIG. 2 illustrates a schematic configuration of the information presentation system according to the embodiment of the present disclosure.

FIG. 2 illustrates a schematic configuration of the information presentation system according to the embodiment. Referring to FIG. 2, in the embodiment, a power grid PG, servers 10, 30, a smart meter 11, EVSEs 40A to 40D, and vehicles 50A to 50D, and mobile terminals 80A to 80D form a vehicle-grid integration (VGI) system 1. The VGI system 1 is an example of the "information presentation system" according to the present disclosure.

In FIG. 2, the mobile terminals 80A to 80D are mobile terminals carried by users of the vehicles 50A to 50D, respectively. Hereinafter, each of the mobile terminals 80A to 80D will be referred to as the "mobile terminal 80" unless individually identified. In the embodiment, each mobile terminal 80 is a smartphone with a touch panel display. However, the present disclosure is not limited to this, and each mobile terminal 80 may be any mobile terminal. For example, each mobile terminal 80 may be a tablet, a smartphone, a wearable device (e.g., a smartwatch), or an electronic key.

Although FIG. 2 shows four vehicles, four mobile terminals, and four EVSEs, the numbers of vehicles, mobile terminals, and EVSEs included in the VGI system 1 are independent of each other and can be determined as desired. The VGI system 1 may include 10 or more vehicles, 10 or more mobile terminals, and 10 or more EVSEs, or may include 100 or more vehicles, 100 or more mobile terminals, and 100 or more EVSEs. The VGI system 1 may include either or both of a personally owned vehicle (POV) and a vehicle managed by a Mobility as a Service (Maas) provider (MaaS vehicle). The VGI system 1 may include either or both of a non-public EVSE that can only be used by a specific user (e.g., a home EVSE) and a public EVSE that can be used by a large, unspecified number of users.

The vehicle 50A shown in FIG. 2 is electrically connected to the EVSE 40A. In the embodiment, the EVSE 40A is an AC charging facility (e.g., a standard charger) with reverse power flow capability. However, the VGI system 1 may include a charging facility with no reverse power flow capability, or may include a DC charging facility (e.g., a quick charger). When the connector 43 of the charging cable 42 connected to the EVSE 40A is connected to the inlet 110 of the vehicle 50A, the vehicle 50A and the EVSE 40A can communicate with each other, and electric power can also be transferred between the EVSE 40A and the vehicle 50A. The vehicle 50A is thus ready for external charging and external power feeding. The communication equipment 180 mounted on the vehicle 50A is configured to communicate with the EVSE 40A via the charging cable 42. The EVSE 40A and the vehicle 50A may communicate with each other by any communication method. For example, the EVSE 40A and the vehicle 50A may communicate with each other by a controller area network (CAN) or power line communication (PLC). The standard for communication between the EVSE 40A and the vehicle 50A may be ISO/IEC15118 or IEC61851.

The vehicle 50 starts external charging when an external charging start condition is satisfied after the vehicle 50 becomes ready for external charging (e.g., the state of the vehicle 50A shown in FIG. 2). In the embodiment, the external charging start condition is satisfied when a start time of timer charging scheduled in the ECU 150 comes. In the case where neither timer charging nor demand response (DR) participation (will be described in detail later) has been scheduled in the ECU 150, an immediate charging start condition is satisfied when the connector 43 of the charging cable 42 connected to the EVSE is connected to the inlet 110 of the vehicle 50. Immediate charging refers to external charging that starts as soon as the vehicle 50 is ready for external charging. The external charging start condition is also satisfied when the user performs a predetermined charging start operation on the EVSE 40 or the vehicle 50. The charging start operation can be set as desired. For example, the charging start operation may be an operation of pressing a predetermined button by the user. The vehicle 50 may be remotely controlled by the server to perform external charging.

The vehicle 50 starts external power feeding when an external power feeding start condition is satisfied after the vehicle 50 becomes ready for external power feeding (e.g., the state of the vehicle 50A shown in FIG. 2). For example, the external power feeding start condition is satisfied when the user performs a predetermined power feeding start operation on the EVSE 40 or the vehicle 50. The power feeding start operation can be set as desired. For example, the power feeding start operation may be an operation of pressing a predetermined button by the user. The vehicle 50 may be remotely controlled by the server 30 to perform external power feeding.

The power supply circuit 41 included in the EVSE 40A is electrically connected to the power grid PG via the smart meter 11. For example, the battery 130 is externally charged when electric power is supplied from the power grid PG to the vehicle 50A via the power supply circuit 41 and the charging cable 42. When the vehicle 50A performs external power feeding to the EVSE 40A, electric power can be reversely supplied from the vehicle 50A to the power grid PG via the charging cable 42 and the power supply circuit 41. The power supply circuit 41 converts the electric power supplied from the power grid PG to electric power suitable for external charging, and also converts the electric power supplied from the vehicle 50A to electric power suitable for reverse power flow.

The smart meter 11 is configured to measure the amount of electrical energy supplied from the EVSE 40A to the vehicle 50A. The smart meter 11 is also configured to measure the amount of electrical energy reversely supplied from the vehicle 50A to the EVSE 40A. The smart meter 11 is configured to measure power usage at predetermined time intervals (e.g., every 30 minutes) and store the measured power usage therein and send the measured power usage to the server 10. A communication protocol between the smart meter 11 and the server 10 is, e.g., IEC (DLMS/COSEM). The server 10 sends the measured value of the smart meter 11 to the server 30 as needed. The server 10 may send the measured value of the smart meter 11 to the server 30 either periodically or as requested by the server 30.

The communication equipment 180 mounted on each vehicle 50 included in the VGI system 1 is configured to wirelessly communicate with the server 30 via, e.g., a mobile network (telematics). Signals that are transferred between the communication equipment 180 and the server 30 may be encrypted signals. In the embodiment, the communication equipment 180 mounted on the vehicle 50A and the mobile terminal 80A are configured to wirelessly communicate with each other. The ECU 150 can control the mobile terminal 80A by wireless communication to cause the mobile terminal 80A to give notifications to the user. The communication equipment 180 and the mobile terminal 80A may communicate with each other by short-range communication (e.g., direct communication both inside and around the vehicle) such as Bluetooth (registered trademark).

In the embodiment, the VGI system 1 functions as a virtual power plant (VPP). The VPP is a system that aggregates a large number of distributed energy resources (hereinafter also referred to as "DERs") by advanced energy management technology using the Internet of Things (IoT) and performs remote integrated control of the DERs to cause the DERs to function as if they were a single power plant. An example of the DERs is energy resources owned by customers (hereinafter also referred to as the "demand-side resources (DSRs)"). In the VGI system 1, the DSRs for implementing the VPP are electric vehicles equipped with an electrical storage device (i.e., the vehicles 50 shown in FIG. 1).

In the VPP, an electric utility that aggregates the DERs and provides energy management services is called an "aggregator." An electric power company can work with, e.g., the aggregator to balance supply and demand of electric power by demand response (hereinafter also referred to as "DR"). DR is a method of balancing supply and demand of electric power by making a predetermined request to each customer by using demand response signals (hereinafter, also referred to as the "DR signals"). The DR signals are roughly divided into two types: a DR signal that requests either a reduction in power demand or a reverse power flow (hereinafter also referred to as the "downward DR signal"), and a DR signal that requests an increase in power demand (hereinafter also referred to as the "upward DR signal").

The server 10 is a server that belongs to a power transmission and distribution business operator. In the embodiment, the electric power company also serves as a power producer and a power transmission and distribution business operator. The electric power company constructs a power network (i.e., the power grid PG) by power plants and power transmission and distribution facilities, both not shown, and maintains and manages the server 10, the smart meter 11, the EVSEs 40A to 40D, and the power grid PG. The electric power company can make a profit by, e.g., doing business with customers (e.g., individuals or companies) who use electric power. In the embodiment, the electric power company corresponds to a grid operator who operates the power grid PG. The power grid PG according to the embodiment is an example of the "power network" according to the present disclosure.

The server 30 is configured to communicate with the server 10, the vehicles 50A to 50D, and the mobile terminals 80A to 80D. The server 30 is a server that belongs to the aggregator. The server 10 and the server 30 are configured to communicate with each other via, e.g., a virtual private network (VPN). A communication protocol between the server 10 and the server 30 may be OpenADR. In the embodiment, a terminal of the aggregator (e.g., the server 30) is configured to communicate with a terminal of the electric power company (e.g., the server 10) and a terminal of each vehicle user (e.g., the communication equipment 180 and the mobile terminal 80). However, the present disclosure is not limited to this, and the VGI system 1 may include separate servers, one that contacts the electric power company and one that contacts the vehicle users. These servers may be managed by different electric utilities (e.g., upper and lower aggregators).

The server 30 includes a control device 31, a storage device 32, and a communication device 33. The control device 31 includes a processor and is configured to perform predetermined information processing and control the communication device 33. The storage device 32 is configured to save various kinds of information. The communication device 33 includes various communication I/Fs. The control device 31 is configured to communicate with the outside via the communication device 33.

The server 10 is configured to perform load leveling using demand response (DR). When the server 10 performs load leveling, the server 10 first sends a signal requesting participation in DR (hereinafter also referred to as the "DR participation request") to a plurality of aggregator servers (including the server 30). The DR participation request includes a DR target area, the type of DR (e.g., downward DR or upward DR), and a DR period. The DR period is information indicating a DR start time and a DR end time. The server 30 is configured to obtain a DR availability (i.e., the amount of electrical energy that can be adjusted according to DR) and send the obtained DR availability to the server 10 in response to the DR participation request from the server 10. The server 30 can obtain the DR availability based on, e.g., the total of DR capacities (i.e., capacities available for DR) of customers within the aggregator's territory.

The server 10 determines the amount of DR for each aggregator (i.e., the amount of power adjustment to be requested to each aggregator) based on the DR availabilities received from the aggregator servers, and sends a signal instructing to execute DR (hereinafter also referred to as the "DR execution instruction") to each aggregator server (including the server 30). The DR execution instruction includes a DR target area, the type of DR (e.g., downward DR or upward DR), the amount of DR for the aggregator, and a DR period. When the server 30 receives the DR execution instruction, the server 30 allocates the amount of DR to each vehicle 50 available for DR among the vehicles 50 within the aggregator's territory, produces a DR signal for each vehicle 50, and sends the DR signal to each vehicle 50. The DR signal may be a price signal that encourages the user of the vehicle 50 to balance supply and demand, or may be a charge command or a power feed command that is for the server 30 to directly control the vehicle 50. The price signal may include the type of DR (e.g., downward DR or upward DR), the amount of DR for the vehicle 50, a DR period, and incentive information. The price signal may be sent to the mobile terminal 80 instead of or in addition to the vehicle 50. When the vehicle 50 allows remote control (e.g., dispatching by the server 30), the server 30 can directly control the vehicle 50 by sending the charge command or the power feed command to the vehicle 50.

The electric utility can request the user of the vehicle 50 to balance supply and demand on the power grid PG by sending the DR signal. In some cases, the DR signal is sent from the server 30 to the vehicle 50 according to the DR execution instruction, as described above. In other cases, the DR signal is sent from the server 30 to the vehicle 50 based on electric power market information. The ECU 150 is configured to receive the DR signal from the outside of the vehicle 50 via the communication equipment 180. The user of the vehicle 50 may receive the DR signal by the mobile terminal 80. When the ECU 150 and/or the mobile terminal 80 receives the DR signal, the user of the vehicle 50 can contribute to the balancing of supply and demand on the power grid PG requested by the electric utility (e.g., the electric power company or the aggregator) by performing external charging or external power feeding according the DR signal using the EVSE 40 and the vehicle 50. In the embodiment, when the user of the vehicle 50 has contributed to the balancing of supply and demand on the power grid PG requested by the electric utility, the electric utility pays an incentive for the contribution to the user of the vehicle 50 according to the agreement between the user of the vehicle 50 and the electric utility. For example, the contribution corresponds to the amount of electrical energy adjusted by the external charging or external power feeding performed according to the DR signal. In the embodiment, the smart meter 11 measures the contribution.

The electric utility need not necessarily measure the contribution using the smart meter 11, and may measure the contribution by any method. The electric utility may obtain the contribution using the measured value of an electricity meter (not shown) included in the EVSE 40. The electric utility may obtain the contribution using the measured value of a sensor mounted on the vehicle 50. The electric utility may obtain the contribution based on the amount of electrical energy measured by a portable charging cable with a meter function.

In the embodiment, the server 30 and the EVSE 40 do not communicate with each other. However, the server 30 and the EVSE 40 may be configured to communicate with each other. The server 30 may be configured to communicate with the vehicle 50 via the EVSE 40. The EVSE 40 may be configured to communicate with an EVSE management cloud. A communication protocol between the EVSE 40 and the EVSE management cloud may be Open Charge Point Protocol (OCPP).

The vehicle 50 according to the embodiment is an electric vehicle configured to perform external charging and external power feeding. The way of performing external charging and external power feeding varies depending on the user. Depending on the way of performing external charging and external power feeding, the life of the battery 130 may be shortened, or the user may not be able to sufficiently contribute to the balancing of supply and demand on the power grid PG requested by the electric utility. The way that is selected from one perspective (e.g., in terms of battery life) may not be selected from another perspective (e.g., in terms of contribution to the balancing of supply and demand of electric power).

Figure 3:
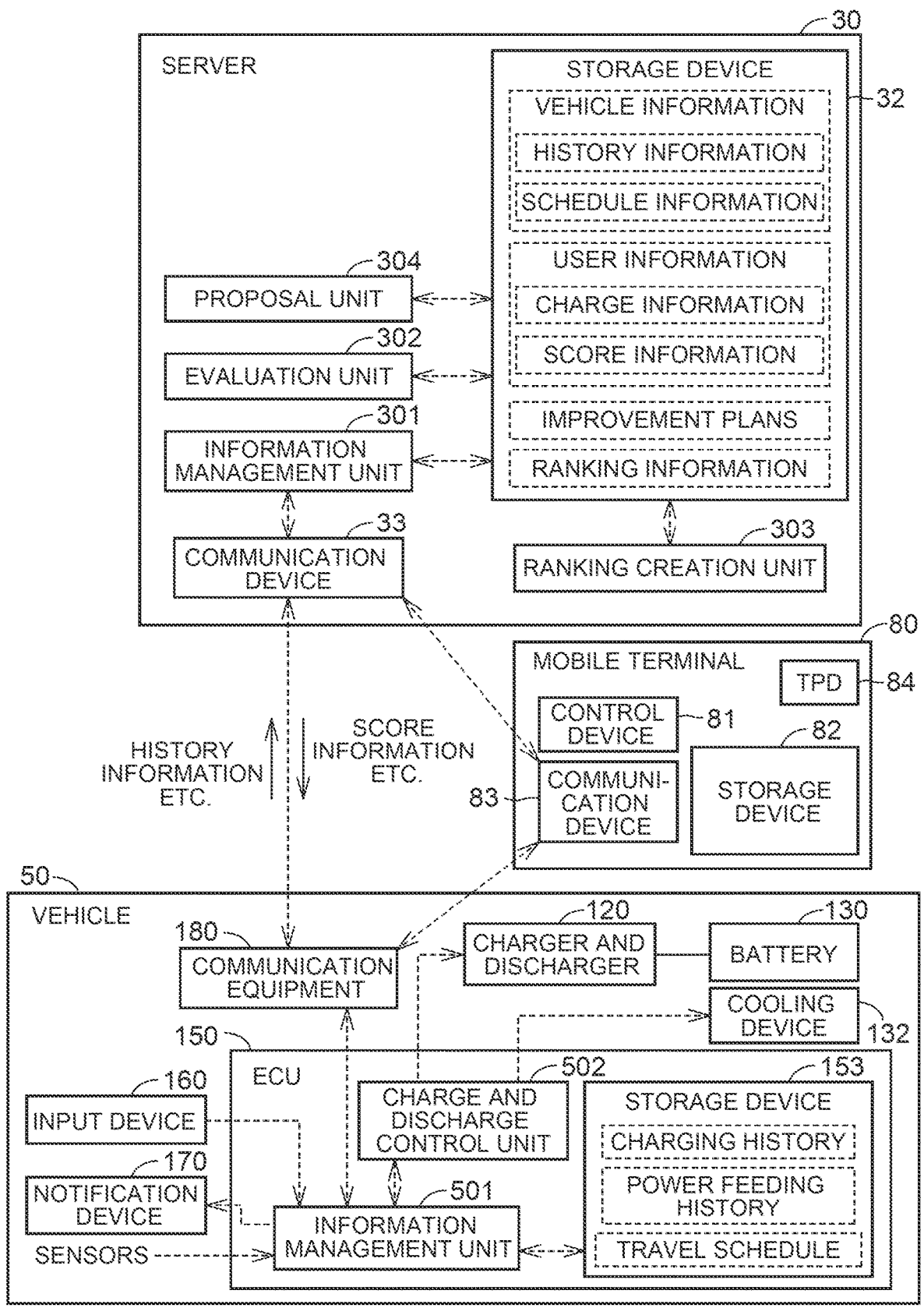
FIG. 3 illustrates detailed configurations of a vehicle control device, a server, and a mobile terminal that are included in the information presentation system according to the embodiment of the present disclosure.

Accordingly, the server 30 according to the embodiment has a configuration that will be described below. The server 30 is thus configured to notify the user of whether the way of performing external charging and external power feeding is good or bad. In the VGI system 1 according to the embodiment, the server 30 is configured to evaluate the user's way of performing external charging and external power feeding from a plurality of perspectives and give a score (grade) for each perspective. With such a configuration, the user can determine himself or herself whether to make an improvement in the current way of performing external charging and external power feeding based on the knowledge that whether the current way of performing external charging and external power feeding is good or bad. FIG. 3 illustrates detailed configurations of the ECU 150 of the vehicle 50, the server 30, and the mobile terminal 80.

Referring to FIG. 3, the mobile terminal 80 includes a control device 81, a storage device 82, a communication device 83, and a touch panel display (TPD) 84. The control device 81 includes a processor and is configured to perform predetermined information processing and control the communication device 83 and the TPD 84. The storage device 82 is configured to save various kinds of information. The communication device 83 includes various communication I/Fs. The control device 81 is configured to communicate with the outside via the communication device 83. The communication device 83 of the mobile terminal 80, the communication device 33 of the server 30, and the communication equipment 180 of the vehicle 50 are configured to communicate with each other. The mobile terminal 80 has predetermined application software (hereinafter, simply referred to as the "app") installed therein. The mobile terminal 80 is carried by the user of the vehicle 50 and can send and receive information to and from the server 30 via the app. The user can operate the app via the TPD 84. The TPD 84 is configured to give notifications to the user of the vehicle 50. The notifications to the user are given by, e.g., display and sound (including voice).

The ECU 150 includes an information management unit 501 and a charge and discharge control unit 502. In the ECU 150 according to the embodiment, each of these units is embodied by the processor 151 shown in FIG. 1 and programs that are executed by the processor 151 (e.g., the programs stored in the storage device 153). However, the present disclosure is not limited to this, and each of these units may be embodied by dedicated hardware (an electronic circuit).

The information management unit 501 is configured to record a history of external charging performed by the vehicle 50 (hereinafter referred to as the "charging history") and a history of external power feeding performed by the vehicle 50 (hereinafter referred to as the "power feeding history") on the storage device 153. The information management unit 501 is also configured to acquire the state of the vehicle 50 (e.g., charging power, feeding power, and the SOC of the battery 130) using the outputs of various sensors mounted on the vehicle 50.

The charging history includes: a charging period, a charging profile, maximum charging power, and charged energy for each external charging event; and a variable indicating the number of external charging events (e.g., a variable that is incremented after each external charging event). The charging period is information indicating start and end times of the external charging event. The charging profile is information indicating changes in state of the vehicle 50 (e.g., the charging power and the SOC of the battery 130) during the charging period. After each external charging event, the following information is recorded on the storage device 153 as the charging history: information indicating whether the external charging was quick charging (i.e., charging with a quick charger), information indicating whether the external charging was timer charging, information indicating whether pre-charge cooling (will be described in detail later) was ON at the start of the external charging event, and information indicating whether the external charging was performed according to upward DR. Every time the quick charging, the timer charging, the external charging with pre-charge cooling ON, or the external charging according to upward DR is performed, variables indicating the number of quick charging events, the number of timer charging events, the number of external charging events with pre-charge cooling ON, and the number of external charging events according to upward DR are incremented accordingly. The information management unit 501 may determine whether the external charging event is finished, based on the state (open/closed) of the relay of the charger and discharger 120. When external charging is performed according to upward DR (i.e., in response to a request for external charging), the amount of electrical energy supplied to the battery 130 by the external charging event (i.e., the cumulative amount of charging power used for the battery 130 during the DR period) is recorded on the storage device 153 as the charging history. The charged energy may be the amount of electrical energy measured by the smart meter 11 minus the amount of electrical energy used for purposes other than the external charging events (e.g., running household appliances). The charged energy may be measured by the monitoring module 121 mounted on the vehicle 50. When the battery 130 is externally charged to full charge, the time from the end of the external charging event until the electric power of the battery 130 is used (hereinafter also referred to as the "full charge standing time after charging") is recorded on the storage device 153 as the charging history.

The power feeding history includes: a power feeding period, a power feeding profile, maximum feeding power, and feeding energy for each external power feeding event; and a variable indicating the number of external power feeding events (e.g., a variable that is incremented after each external power feeding event). The power feeding period is information indicating start and end times of the external power feeding event. The power feeding profile is information indicating changes in state of the vehicle 50 (e.g., the feeding power and the SOC of the battery 130) during the power feeding period. When the battery 130 is at full charge at the start of the external power feeding event, the time from when the battery 130 is fully charged until the start of the external power feeding event (hereinafter also referred to as "full charge standing time before power feeding") is recorded on the storage device 153 as the power feeding history. After each external power feeding event, the following information is recorded on the storage device 153 as the power feeding history: information indicating whether pre-power feed cooling (will be described in detail later) was ON at the start of the external power feeding event, and information indicating whether the external power feeding was performed according to downward DR. Every time the external power feeding with pre-power feed cooling ON or the external power feeding according to downward DR is performed, variables indicating the number of external power feeding events with pre-power feed cooling ON and the number of external power feeding events according to downward DR are incremented accordingly. The information management unit 501 may determine whether the external power feeding event is finished, based on the state (open/closed) of the relay of the charger and discharger 120. When external power feeding according to downward DR is performed, the amount of electrical energy supplied by the external power feeding event (i.e., the cumulative amount of electric power discharged from the battery 130 during the DR period) is recorded on the storage device 153 as the power feeding history. The feeding energy during the DR period can be measured by methods similar to those described above for the charged energy.

The information management unit 501 is configured to save a travel schedule of the vehicle 50 in the storage device 153. The travel schedule is information indicating a travel plan of the vehicle 50. The travel schedule may be the time a POV leaves home or an operation plan of a MaaS vehicle. The travel schedule may be a travel schedule set by the input device 160 (e.g., a scheduled departure time, a scheduled arrival time, and a planned travel route set via a car navigation system).

The information management unit 501 is configured to sequentially send the charging history, the power feeding history, and the travel schedule to the server 30.

The charge and discharge control unit 502 is configured to control charging and discharging of the battery 130 by controlling the charger and discharger 120. When the external charging start condition described above is satisfied after the vehicle 50 becomes ready for external charging, the charge and discharge control unit 502 starts external charging. When the external power feeding start condition described above is satisfied after the vehicle 50 becomes ready for external power feeding, the charge and discharge control unit 502 starts external power feeding. The charge and discharge control unit 502 may be configured to be remotely controlled by the server 30 during the DR period. The user of the vehicle 50 may be able to set via the input device 160 or the mobile terminal 80 whether to allow or prohibit remote control of the charge and discharge control unit 502.

In the embodiment, the user can set the pre-charge cooling and the pre-power feed cooling to ON and OFF in the charge and discharge control unit 502 via the input device 160 or the mobile terminal 80. When the pre-charge cooling is ON, the charge and discharge control unit 502 controls the temperature of the battery 130 to a predetermined first temperature or lower before starting the external charging event. When the temperature of the battery 130 is higher than the first temperature, the charge and discharge control unit 502 operates the cooling device 132 to cool the battery 130 until the temperature of the battery 130 becomes equal to or lower than the first temperature. The charge and discharge control unit 502 starts the external charging event after confirming that the temperature of the battery 130 has become equal to or lower than the first temperature. When the pre-power feed cooling is ON, the charge and discharge control unit 502 controls the temperature of the battery 130 to a predetermined second temperature or lower before starting the external power feeding event in a manner similar to that described above for the pre-charge cooling. The first temperature and the second temperature may be the same or different. When the pre-charge cooling is OFF, the charge and discharge control unit 502 does not cool the battery 130 before starting the external charging event. When the pre-power feed cooling is OFF, the charge and discharge control unit 502 does not cool the battery 130 before starting the external power feeding event.

The server 30 includes an information management unit 301, an evaluation unit 302, a ranking creation unit 303, and a proposal unit 304. In the server 30 according to the embodiment, each of these units is embodied by the processor of the control device 31 shown in FIG. 2 and programs that are executed by the processor (e.g., programs stored in the storage device 32). However, the present disclosure is not limited to this, and each of these units may be embodied by dedicated hardware (an electronic circuit).

The server 30 is configured to manage information on each registered user (hereinafter also referred to as the "user information") and information on each registered vehicle 50 (hereinafter also referred to as the "vehicle information"). Identification information for identifying users (hereinafter also referred to as the "user IDs") is given to each user, and the server 30 manages the user information based on the user IDs. The user IDs also serve as information for identifying the mobile terminals 80 carried by the users (terminal IDs). The user information includes the communication address of the mobile terminal 80 carried by the user and a vehicle ID of the vehicle 50 that belongs to the user. The vehicle IDs are identification information for identifying the vehicles 50. The vehicle IDs are given to each vehicle 50, and the server 30 manages the vehicle information based on the vehicle IDs. The vehicle information includes the communication address of the communication equipment 180 mounted on the vehicle 50. The user information and the vehicle information are stored in the storage device 32.

The vehicle information further includes history information and schedule information. The history information and the schedule information are updated according to information received from each vehicle 50. The history information includes the charging history and the power feeding history received from each vehicle 50. The schedule information includes the travel schedule received from each vehicle 50. The schedule information further includes a DR period (e.g., a charging schedule, a power feeding schedule, and a reduced charging schedule that are requested to the vehicle 50 by a DR signal). The reduced charging schedule is information indicating a period during which charging is restricted (i.e., a restriction start time and a restriction end time). Examples of the charging restriction includes prohibition of charging and limitation on charging power (i.e., prohibition of charging with predetermined electric power or more). The information management unit 301 sends a DR signal requesting balancing of supply and demand on the power grid PG to the user of the vehicle 50. When the user of the vehicle 50 consents to participate in DR, the information management unit 301 updates the DR period associated with this user (more specifically, the vehicle ID of the vehicle 50 that belongs to this user). The DR signal may be sent to the communication equipment 180 or may be sent to the mobile terminal 80.

The user information includes charge information and score information. The charge information and the score information are stored in the storage device 32 by the evaluation unit 302.

The charge information includes electricity charges (i.e., the total amount of electricity charges for external charging events for a predetermined period) and the amount of incentives received (i.e., the total amount of incentives the user received from participation in DR for the predetermined period). The evaluation unit 302 can obtain for each user the electricity charges and the amount of incentives received, based on a unit rate for electricity and a unit incentive amount that can be acquired from the server 10 and the history information that can be acquired from each vehicle 50.

The score information includes first score information indicating the number of points as the user's score for external charging and second score information indicating the number of points as the user's score for external power feeding.

The evaluation unit 302 is configured to evaluate the user of each vehicle 50 using the information received from each vehicle 50 (e.g., the charging history) and give a score for the user's way of performing external charging according to a plurality of criteria. The first score information thus obtained indicates two separate scores: the user's score for external charging given according to a first criterion (hereinafter also referred to as the "charging score X"), and the user's score for external charging given according to a second criterion (hereinafter also referred to as the "charging score Y"). The evaluation unit 302 is also configured to evaluate the user of each vehicle 50 using the information received from each vehicle 50 (e.g., the power feeding history) and give a score for the user's way of performing external power feeding according to a plurality of criteria. The second score information thus obtained indicates two separate scores: the user's score for external power feeding given according to a first criterion (hereinafter also referred to as the "power feeding score X"), and the user's score for external power feeding given according to a second criterion (hereinafter also referred to as the "power feeding score Y").

The first criterion involves degradation of the battery 130 caused by each of external charging and external power feeding. The charging score X is higher for the user who performs external charging in such a way that the battery 130 degrades less. The power feeding score X is higher for the user who performs external power feeding in such a way that the battery 130 degrades less. In other words, the charging score X and the power feeding score X are higher for the user who performs external charging and external power feeding while giving more consideration to the life of the battery 130. The second criterion involves contribution to the balancing of supply and demand on the power grid PG (hereinafter also referred to as the "VPP contribution"). The charging score Y and the power feeding score Y are higher for the user who performs external charging and external power feeding in such a way that the VPP contribution becomes greater.

Figure 4:
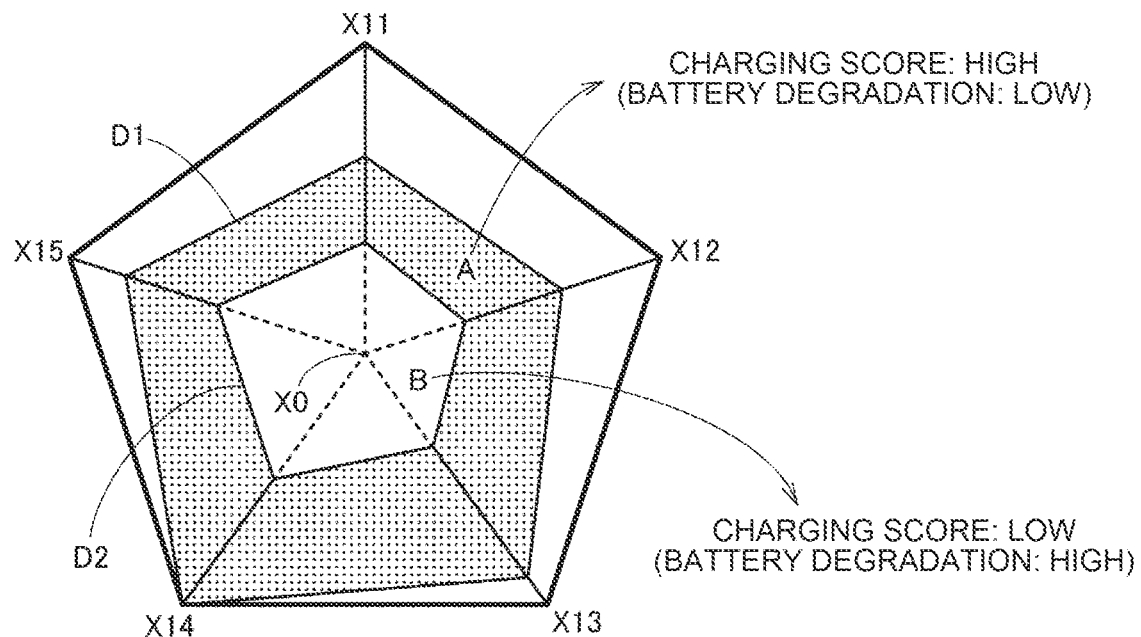
FIG. 4 illustrates a scoring method for a charging score X according to the embodiment of the present disclosure.

FIG. 4 illustrates a scoring method for the charging score X. In the radar chart of FIG. 4, X11 represents the number of quick charging events, X12 represents the maximum charging power (the average maximum charging power when the number of charging events is two or more), X13 represents the number of timer charging events, X14 represents the full charge standing time after charging (the cumulative time when the number of charging events is two or more), and X15 represents the number of external charging events with pre-charge cooling ON. The center XO represents the origin of the radar chart.

Referring to FIG. 4, the lesser the degradation of the battery 130 due to external charging (hereinafter also referred to as the "charging degradation"), the farther away (towards the outside) the data values of the items X11 to X15 are plotted from the center XO. More specifically, charging with a quick charger (i.e., quick charging) tends to accelerate degradation of the battery 130 more than charging with a standard charger (i.e., standard charging). Accordingly, the smaller the number of quick charging events, the closer the data value of X11 is plotted towards the outside. The higher the maximum charging power, the more the degradation of the battery 130 tends to be accelerated. Accordingly, the lower the maximum charging powder, the closer the data value of X12 is plotted towards the outside. Immediate charging tends to accelerate degradation of the battery 130 more than timer charging. Accordingly, the larger the number of timer charging events, the closer the data value of X13 is plotted towards the outside. Degradation of the battery 130 tends to be accelerated when the battery 130 is left at full charge for a long time. Accordingly, the shorter the full charge standing time after charging, the closer the data value of X14 is plotted towards the outside. Degradation of the battery 130 due to external charging tends to be accelerated when the temperature of the battery 130 is too high at the start of the external charging event. Accordingly, the larger the number of external charging events with pre-charge cooling ON, the closer the data value of X15 is plotted towards the outside.

Lines D1, D2 represent the charging scores X of the vehicles 50A, 50B (FIG. 2), respectively. The areas inside the line D1, D2 correspond to the charging scores X of the vehicles 50A, 50B, respectively. The larger the area, the higher the charging score X. That is, the lesser the charging degradation, the higher the charging score X. The radar chart of FIG. 4 shows that the charging score X (D1) of the vehicle 50A is higher than the charging score X (D2) of the vehicle 50B.

Figure 5:
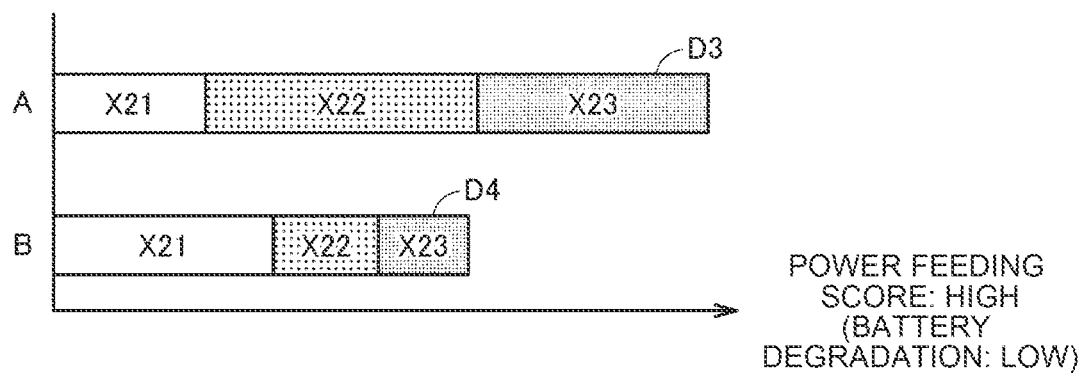
FIG. 5 illustrates a scoring method for a power feeding score X according to the embodiment of the present disclosure.

FIG. 5 illustrates a scoring method for the power feeding score X. In the bar graph of FIG. 5, X21 represents the maximum feeding power (the average maximum feeding power when the number of power feeding events is two or more), X22 represents the full charge standing time before power feeding (the cumulative time when the number of power feeding events is two or more), and X23 represents the number of external power feeding events with pre-power feed cooling ON.

Referring to FIG. 5, the lesser the degradation of the battery 130 due to external power feeding (hereinafter also referred to as the "power feeding degradation"), the longer the portions of each bar corresponding to X21 to X23. More specifically, the higher the maximum feeding power, the more the degradation of the battery 130 tends to be accelerated. Accordingly, the lower the maximum feeding powder, the longer the portion X21. Degradation of the battery 130 tends to be accelerated when the battery 130 is left at full charge for a long time. Accordingly, the shorter the full charge standing time before power feeding, the longer the portion X22. Degradation of the battery 130 due to external power feeding tends to be accelerated when the temperature of the battery 130 is too high at the start of the external power feeding event. Accordingly, the larger the number of external power feeding events with pre-power feed cooling ON, the longer the portion X23.

Bars D3, D4 represent the power feeding scores X of the vehicles 50A, 50B (FIG. 2), respectively. The lengths of the bars D3, D4 correspond to the power feeding scores X of the vehicles 50A, 50B, respectively. The longer the bars D3, D4, the higher the power feeding score X. That is, the lesser the power feeding degradation, the higher the power feeding score X. The bar graph of FIG. 5 shows that the power feeding score X (D3) of the vehicle 50A is higher than the power feeding score X (D4) of the vehicle 50B.

Figure 6:
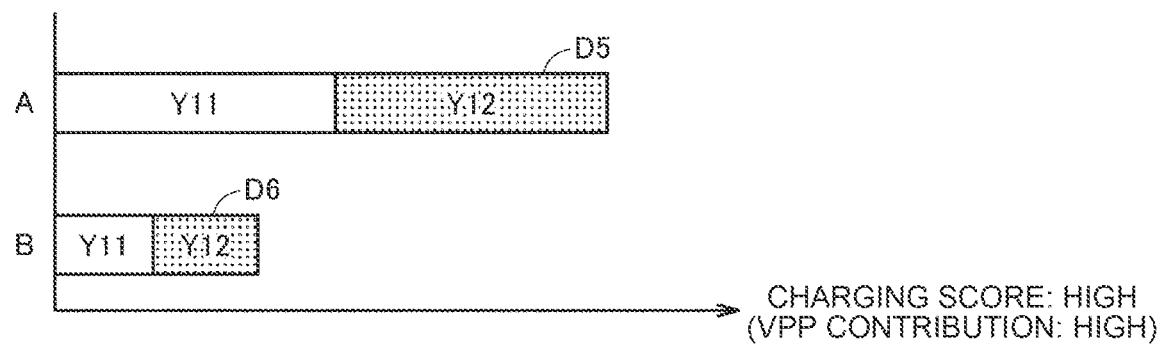
FIG. 6 illustrates a scoring method for a charging score Y according to the embodiment of the present disclosure.

FIG. 6 illustrates a scoring method for the charging score Y. In the bar graph of FIG. 6, Y11 represents the number of external charging events according to upward DR, and Y12 represents the amount of electrical energy used for external charging according to upward DR (the cumulative amount of electrical energy when the number of external charging events according to upward DR is two or more). The fact that external charging according to upward DR has been performed means that the user has participated in DR that requests external charging.

The contribution to the balancing of supply and demand on the power grid PG by external charging is evaluated based on either or both of the number of external charging events that have taken place in response to the request for external charging and the amount of electrical energy supplied to the electrical storage device by external charging in response to the request for external charging. Referring to FIG. 6, the greater the VPP contribution, the longer the portions of each bar corresponding to Y11, Y12. More specifically, it is considered that the larger the number of external charging events according to upward DR and the amount of electrical energy used for external charging according to upward DR, the greater the contribution to the balancing of supply and demand on the power grid PG (FIG. 2). Accordingly, the larger the number of external charging events according to upward DR, the longer the portion Y11. The larger the amount of electrical energy used for external charging according to upward DR, the longer the portion Y12.

Bars D5, D6 represent the charging scores Y of the vehicles 50A, 50B (FIG. 2), respectively. The lengths of the bars D5, D6 correspond to the charging scores Y of the vehicles 50A, 50B, respectively. The longer the bars D5, D6, the higher the charging score Y. That is, the greater the VPP contribution, the higher the charging score Y. The bar graph of FIG. 6 shows that the charging score Y (D5) of the vehicle 50A is higher than the charging score Y (D6) of the vehicle 50B.

FIG. 7 illustrates a scoring method for the power feeding score Y. In the bar graph of FIG. 7, Y21 represents the number of external power feeding events according to downward DR, and Y22 represents the amount of electrical energy used for external power feeding according to downward DR (the cumulative amount of electrical energy when the number of external power feeding events according to downward DR is two or more). The fact that external power feeding according to downward DR has been performed means that the user has participated in DR that requests external power feeding.

The contribution to the balancing of supply and demand on the power grid PG by external power feeding is evaluated based on either or both of the number of external power feeding events that have taken place in response to the request for external power feeding and the amount of electrical energy supplied by external power feeding in response to the request for external power feeding. Referring to FIG. 7, the greater the VPP contribution, the longer the portions of each bar corresponding to Y21, Y22. More specifically, it is considered that the larger the number of external power feeding events according to downward DR and the amount of electrical energy supplied by external power feeding according to downward DR, the greater the contribution to the balancing of supply and demand on the power grid PG (FIG. 2). Accordingly, the larger the number of external power feeding events according to downward DR, the longer the portion Y21. The larger the amount of electrical energy supplied by external power feeding according to downward DR, the longer the portion Y22.

Bars D7, D8 represent the power feeding scores Y of the vehicles 50A, 50B (FIG. 2), respectively. The lengths of the bars D7, D8 correspond to the power feeding scores Y of the vehicles 50A, 50B, respectively. The longer the bars D7, D8, the higher the power feeding score Y. That is, the greater the VPP contribution, the higher the power feeding score Y. The bar graph of FIG. 7 shows that the power feeding score Y (D7) of the vehicle 50A is higher than the power feeding score Y (D8) of the vehicle 50B.

For each of the charging scores X, Y and the power feeding scores X, Y, the user can set a weight for each evaluation item (e.g., the scale intervals for X11 to X15 on the radar chart of FIG. 4) as desired. The scoring methods for the charging scores X, Y and the power feeding scores X, Y are not limited to the above methods using a radar chart or a bar graph. The evaluation unit 302 may calculate the charging scores X, Y and the power feeding scores X, Y for each vehicle 50 based on the history information (i.e., the charging history and the power feeding history) of each vehicle 50, according to relational expressions obtained by statistical learning using big data. A trained model obtained by machine learning using artificial intelligence (AI) may be used instead of the relational expressions.

Referring back to FIG. 3, the evaluation unit 302 calculates each of the charging scores X, Y and the power feeding scores X, Y using the history information acquired from each vehicle 50. The period for which the user is evaluated (hereinafter also referred to as the "evaluation period") can be set as desired. The evaluation period may be the period from the time of registration of the user on the server 30 to the present. In the embodiment, the evaluation period is one year (e.g., the period from January 1 to December 31). The evaluation unit 302 calculates each of the charging scores X, Y and the power feeding scores X, Y using the history information for the evaluation period. Each of the charging scores X, Y and the power feeding scores X, Y is reset to zero after each year, namely after each evaluation period. Since only the way of performing external charging and external power feeding in the past year are reflected in the scores, each score accurately indicates whether the current way of performing external charging and external power feeding is good or bad.

The ranking creation unit 303 creates a ranking list showing the rank of each user in a predetermined group (hereinafter also referred to as the "target group") and records the created ranking list in the storage device 32 as ranking information. In the embodiment, a group of all users registered on the server 30 (hereinafter also referred to as the "whole group") and groups of the users divided according to their vehicle models (hereinafter also referred to as the "vehicle model groups") are used as the target groups. The vehicle model group is a group formed only by the users who are using the vehicle 50 of the same model. The vehicle models may be classified according to catalogs of automobile manufacturers. The vehicle models of the same type may be put in the same category so that the number of categories of vehicle models does not become too large. The target groups may be either large groups of 100 users or more or small groups of about 3 to 10 users.

The ranking creation unit 303 creates a ranking list for the charging score X (hereinafter also referred to as the "first battery degradation rankings") by ranking the users in descending order of the charging score X for each of the whole group and the vehicle model groups. The ranking creation unit 303 also creates a ranking list for the power feeding score X (hereinafter also referred to as the "second battery degradation rankings") by ranking the users in descending order of the power feeding score X for each of the whole group and the vehicle model groups. The ranking creation unit 303 also creates a ranking list for the charging score Y (hereinafter referred to as the "first VPP rankings") by ranking the users in descending order of the charging score Y for each of the whole group and the vehicle model groups. The ranking creation unit 303 also creates a ranking list for the power feeding score Y (hereinafter referred to as the "second VPP rankings") by ranking the users in descending order of the power feeding score Y for each of the whole group and the vehicle model groups.

FIG. 8 illustrates an example of the ranking lists that are created by the ranking creation unit 303. Referring to FIG. 8, the battery degradation rankings and the VPP rankings show the rank of each user in the whole group and the rank of each user in each vehicle model group (vehicle model U, vehicle model V, . . . ). In FIG. 8, "UID-**" indicates the user ID of each ranked user.

Referring back to FIG. 3, the proposal unit 304 determines an improvement plan for each user based on the evaluation results for each user obtained by the evaluation unit 302 (e.g., the evaluation results for each item shown in FIGS. 4 to 7). For example, an implement plan for the users scored particularly low for X11 (the number of quick charging events) in FIG. 4 may be to recommend charging with a standard charger to reduce the frequency of quick charging events. An implement plan for the users scored particularly low for X14 (the full charge standing time after charging) in FIG. 4 may be to reduce the time from when the battery 130 is fully charged until departure of the vehicle 50 by using timer charging. The proposal unit 304 may create an improvement plan (e.g., a recommended charging schedule and/or power feeding schedule) for the low-ranked users, based on the charging histories and/or power feeding histories of the high-ranked users. The proposal unit 304 may determine an improvement plan according to the evaluation results by searching a cloud database (e.g., a database of improvement plans for each situation). The database may manage improvement plans (e.g., a recommended charging schedule and/or power feeding schedule) for each travel schedule. An improvement plan may be searched for through a search engine using artificial intelligence (AI). The search engine may be configured to search the database according to an input travel schedule and output an improvement plan (e.g., a recommended charging schedule and/or power feeding schedule) suitable for the travel schedule.

The information management unit 301 is configured to deliver the history information and the charge information stored in the storage device 32, the evaluation results by the evaluation unit 302, and the improvement plan determined by the proposal unit 304 to each user registered on the server 30. In the embodiment, the history information, the charge information, the evaluation results, and the improvement plan that are sent to each user are the history information, the charge information, the evaluation results, and the improvement plan of the user himself or herself. The history information, the charge information, the evaluation results, and the improvement plan may be sent to the user's communication equipment 180 or may be sent to the user's mobile terminal 80. When the communication equipment 180 of the vehicle 50 receives the above information from the server 30, the information management unit 501 controls the notification device 170 to notify the user of the received information. When the communication device 83 of the mobile terminal 80 receives the above information from the server 30, the control device 81 controls the TPD 84 to notify the user of the received information.

FIG. 9 illustrates an example of the evaluation results that are notified to the user. Referring to FIG. 9, in this example, the following information included in the above history information regarding external charging and external power feeding is displayed to the user: the number of external charging events, the amount of electrical energy used for external charging, and the full charge standing time for external charging; and the number of external power feeding events, the amount of electrical energy supplied by external power feeding, and the full charge standing time for external power feeding.

For the number of external charging events, the following separate values are displayed: the total number of external charging events (total), the number of quick charging events, the number of timer charging events, the number of external charging events with pre-charge cooling ON, and the number of external charging (VPP) events according to upward DR. For the amount of electrical energy used for external charging, the following separate values are displayed: the total amount of electrical energy used for external charging (total) and the amount of electrical energy used for external charging (VPP) according to upward DR. The full charge standing time for external charging corresponds to the full charge standing time after charging.

For the number of external power feeding events, the following separate values are displayed: the total number of external power feeding events (total), the number of external power feeding events with pre-power feed cooling ON, and the number of external power feeding (VPP) events according to downward DR. For the amount of electrical energy supplied by external power feeding, the following separate values are displayed: the total amount of electrical energy supplied by external power feeding (total) and the amount of electrical energy supplied by external power feeding (VPP) according to downward DR. The full charge standing time for external power feeding corresponds to the full charge standing time before power feeding.

The charge information is also displayed to the user. The electricity charges for external charging correspond to the total amount of electricity charges for external charging events for the evaluation period. The VPP incentives for external charging correspond to the total amount of incentives the user received from performing external charging according to upward DR for the evaluation period. The VPP incentives for external power feeding correspond to the total amount of incentives the user received from performing external power feeding according to downward DR for the evaluation period.

The evaluation results and the improvement plan are also displayed to the user. The scores and ranks shown in FIG. 9 correspond to the evaluation results. Regarding the battery degradation due to external charging, the score (1500) corresponds to the charging score X, the overall rank (25) corresponds to the rank of the user's charging score X in the whole group, and the rank by vehicle model (1) corresponds to the rank of the user's charging score X in the vehicle model group. Regarding the battery degradation due to external power feeding, the score (300) corresponds to the power feeding score X, the overall rank (70) corresponds to the rank of the user's power feeding score X in the whole group, and the rank by vehicle model (5) corresponds to the rank of the user's power feeding score X in the vehicle model group. Regarding the VPP contribution of external charging, the score (500) corresponds to the charging score Y, the overall rank (50) corresponds to the rank of the user's charging score Y in the whole group, and the rank by vehicle model (3) corresponds to the rank of the user's charging score Y in the vehicle model group. Regarding the VPP contribution of external power feeding, the score (200) corresponds to the power feeding score Y, the overall rank (120) corresponds to the rank of the user's power feeding score Y in the whole group, and the rank by vehicle model (10) corresponds to the rank of the user's power feeding score Y in the vehicle model group.

In the example of FIG. 9, the overall rank and the rank by vehicle model are displayed to the user. The user can therefore compare the overall rank with the rank by vehicle model to know how much the model of the vehicle 50 he or she is using is suitable for external charging and external power feeding. For example, in the case where the overall rank is low but the rank by vehicle model is high for external charging, it can be presumed that this vehicle model is not suitable for external charging.

In the embodiment, each of the charging score X, the rank of the charging score X, the charging score Y, and the rank of the charging score Y is an example of the "first evaluation information" according to the present disclosure. Each of the power feeding score X, the rank of the power feeding score X, the power feeding score Y, and the rank of the power feeding score Y is an example of the "second evaluation information" according to the present disclosure.

Figure 10:
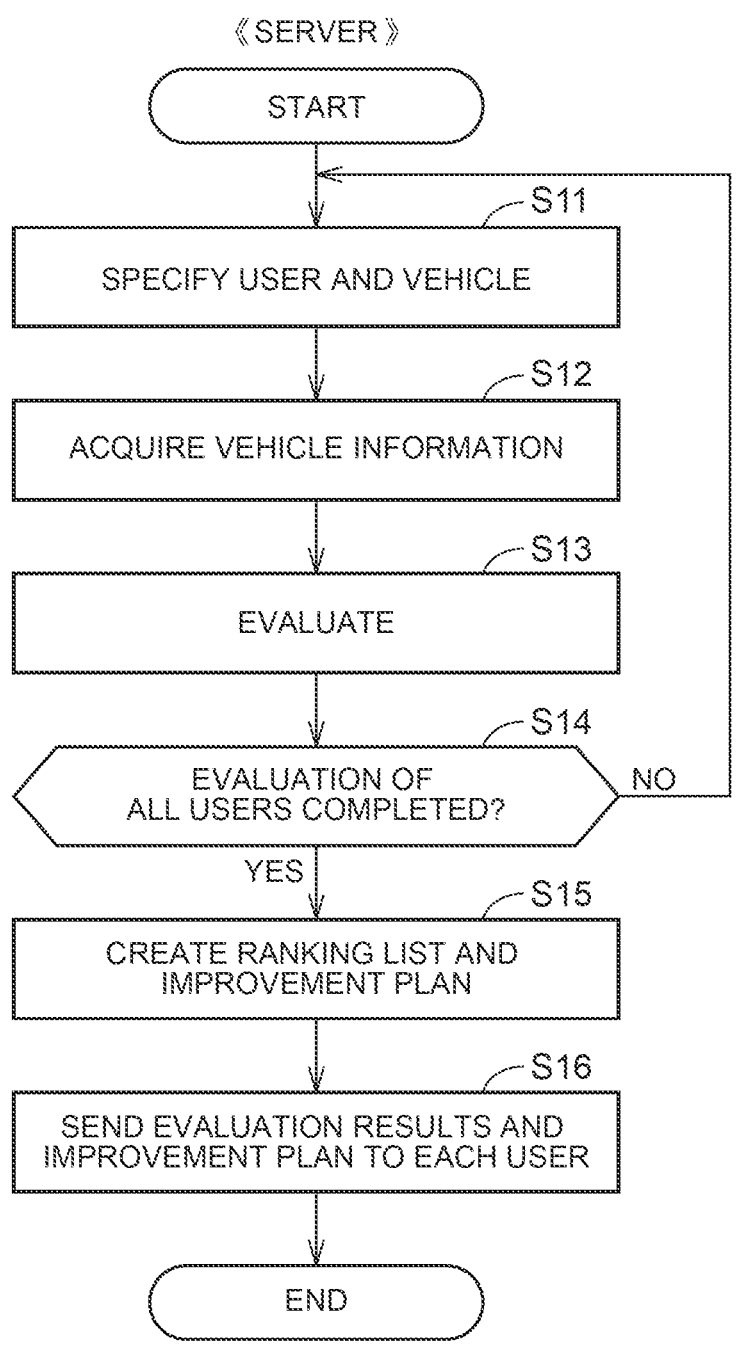
FIG. 10 is a flowchart of an information presentation method that is performed by a server according to the embodiment of the present disclosure.

FIG. 10 is a flowchart of an information presentation method that is performed by the server 30. The process illustrated in this flowchart is performed at a predetermined evaluation timing. The process of FIG. 10 may be performed periodically. The process of FIG. 10 may be performed at a fixed time every day.

Referring to FIG. 10 together with FIGS. 2 and 3, in step (hereinafter abbreviated as "S") 11, the evaluation unit 302 specifies the user and his or her vehicle to be evaluated by the user ID and the vehicle ID. The user to be evaluated is selected from the users who have not been evaluated in the target group. In S12, the evaluation unit 302 acquires the history information associated with the vehicle ID specified in S11 from the vehicle information stored in the storage device 32. In S13, the evaluation unit 302 evaluates this user's way of performing external charging and external power feeding by using the history information acquired in S12. More specifically, the evaluation unit 302 calculates the charging scores X, Y and the power feeding scores X, Y (see FIGS. 4 to 7). The evaluation unit 302 then updates the score information associated with the user ID specified in S11 out of the user information stored in the storage device 32 according to the evaluation results. S13 according to the embodiment is an example of the "first step."

In S14, the evaluation unit 302 determines whether evaluation of all the users belonging to the target group has been completed. In the case where evaluation of all the users belonging to the target group has not been completed (NO in S14), S11 to S13 are repeated to evaluate the users who have not been evaluated.

The routine proceeds to S15 when evaluation of all the users belonging to the target group is completed (YES in S14). In S15, the ranking creation unit 303 creates a ranking list (more specifically, the first battery degradation rankings, the second battery degradation rankings, the first VPP rankings, and the second VPP rankings described above) using the evaluation results, and the proposal unit 304 creates an improvement plan for each user using the evaluation results. The proposal unit 304 does not create an improvement plan for the users for whom it is determined that no improvement is necessary (e.g., the high-ranked users). For the users for whom it is determined that no improvement is necessary, the proposal unit 304 creates a praise message praising the way of performing external charging and external power feeding instead of the improvement plan.

After S15, the information management unit 301 sends in S16 the evaluation results (more specifically, the charging scores X, Y, the power feeding scores X, Y, and the rank of each score) and the improvement plan (or the praise message) to each user belonging to the target group. The information management unit 301 may send the history information and the charge information to each user together with the evaluation results and the improvement plan (or the praise message). The series of steps of FIG. 10 ends when S16 ends. S16 according to the embodiment is an example of the "second step."

Figure 11:
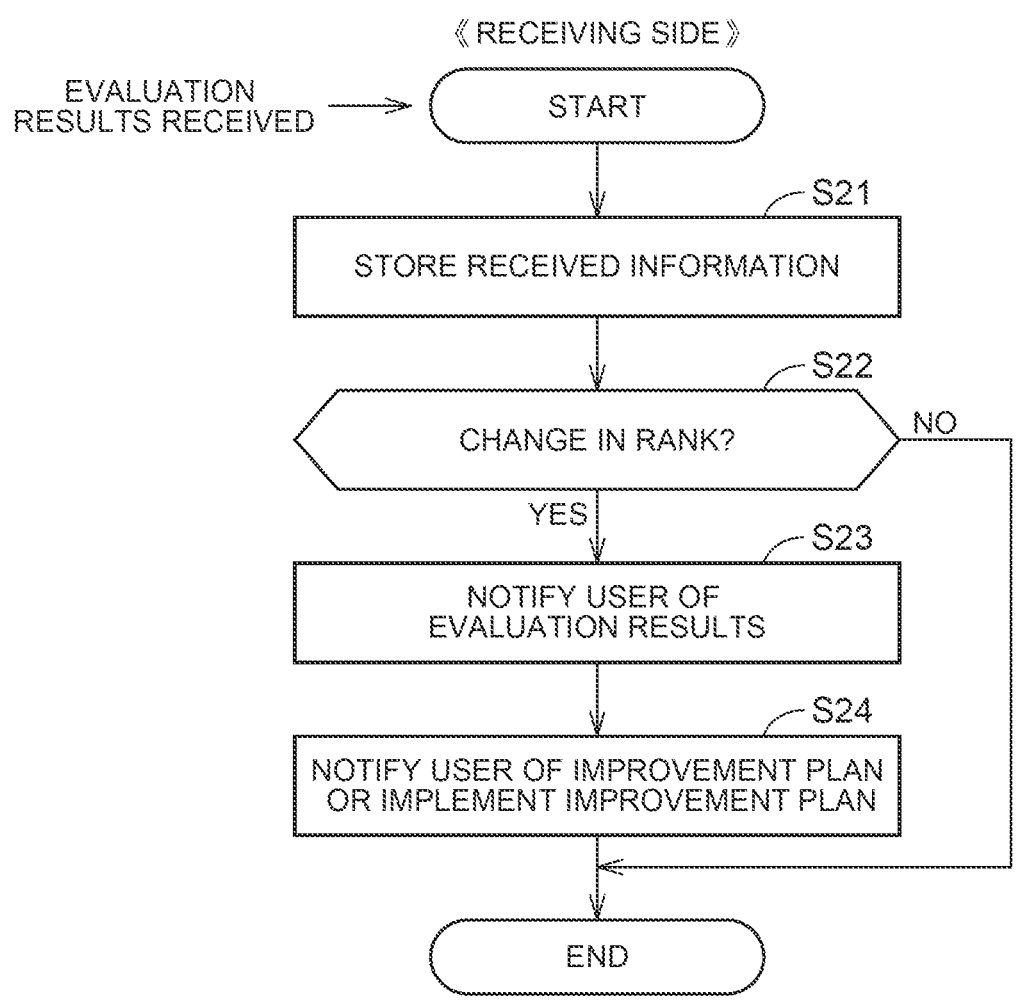
FIG. 11 is a flowchart of a process that is performed when the vehicle according to the embodiment of the present disclosure receives evaluation results.

FIG. 11 is a flowchart of a process that is performed by the vehicle 50 when the vehicle 50 receives the evaluation results from the server 30. The process illustrated in this flowchart is performed every time the vehicle 50 receives the evaluation results from the server 30.

Referring to FIG. 11 together with FIGS. 2 and 3, in S21, the information management unit 501 of the ECU 150 saves information received from the server 30 (e.g., the history information, the charge information, the evaluation results, and the improvement plan) in the storage device 153. The evaluation results are accumulated in the storage device 153 in association with the evaluation timing. In S22, the information management unit 501 refers to the evaluation results saved in the current routine and determines based on the evaluation results saved in the previous routine whether there is a change in rank of any of the charging scores X, Y and the power feeding scores X, Y. The series of steps of FIG. 11 ends when there is no change in rank of the charging scores X, Y and the power feeding scores X, Y (NO in S22). The routine proceeds to S23 when there is a change in rank of any of the charging scores X, Y and the power feeding scores X, Y (YES in S22). In S22, whether there is a large change in rank (e.g., whether the rank has changed by a predetermined value or more) may be determined instead of whether there is a change in rank.

In S23, the information management unit 501 controls the notification device 170 to notify the user of the evaluation results (see, e.g., FIG. 9). Thereafter, in S24, the information management unit 501 controls the notification device 170 to notify the user of the improvement plan (or the praise message) (see, e.g., FIG. 9). The notification steps S23, S24 may be performed simultaneously. For example, the evaluation results and the improvement plan (or the praise message) may be displayed on one screen.

In S24, the improvement plan may be implemented. For example, when the score of X11 (the number of quick charging events) in FIG. 4 is particularly low, the settings of the car navigation system of the vehicle 50 may be changed so that the car navigation system preferentially guides the vehicle to a standard charger over a quick charger. When the rank indicated by the evaluation results is lower than a predetermined rank, the vehicle 50 may be automatically connected to a remote service terminal so that the user of the vehicle 50 can receive advice from an operator. An operator who provides remote service is assigned to each remote service terminal. The remote service is a service in which the operator remotely assists in operation of each vehicle 50. The user of the vehicle 50 may receive advice from a high-ranked user instead of the operator.

The series of steps of FIG. 11 ends when S24 ends. As described above, in the information presentation system (VGI system 1) according to the embodiment, the server 30 is configured to perform the process shown in FIG. 10. The server 30 evaluates the user of each vehicle 50 using the information acquired from each vehicle 50 (S13 in FIG. 10) and sends the evaluation results to each evaluated user (S16 in FIG. 10). The evaluation results that are sent to each user include the first evaluation information indicating how high the user's scores for external charging are (e.g., the charging scores X, Y and their ranks) and the second evaluation information indicating how high the user's scores for external power feeding are (e.g., the power feeding scores X, Y and their ranks).

According to the above information presentation system, the first evaluation information and the second evaluation information can be sent to the user. The user can thus know whether the way of performing external charging and external power feeding is good or bad by referring to the received information.

In the information presentation system (VGI system 1) according to the embodiment, the vehicle 50 functions as an information presentation device. The vehicle 50 sends the history information of the vehicle 50 to the server 30 (see FIG. 3). The vehicle 50 is configured to perform the process shown in FIG. 11. The vehicle 50 receives information indicating how high the scores calculated using the history information of the vehicle 50 are (the first evaluation information and the second evaluation information) from the server 30 and presents the first evaluation information and the second evaluation information to the user by using the received information (S23 in FIG. 11).

According to the information presentation device, the first evaluation information and the second evaluation information can be presented to the user. The user can thus know from the presented information whether the way of performing external charging and external power feeding is good or bad.

In the VGI system 1, the mobile terminal 80 may function as an information presentation device. The mobile terminal 80 may perform the series of steps of FIG. 11 when the mobile terminal 80 receives the evaluation results from the server 30. The mobile terminal 80 may perform the notification steps S23, S24 of FIG. 11 by pop-ups.

In the process of FIG. 11, the user is notified of the evaluation results only when there is a change in rank (YES in S22). Since the notification frequency is reduced, the user feels less bothered by the notifications. However, the present disclosure is not limited to this, and S22 in the process of FIG. 11 may be omitted and the user may be notified of the evaluation results even when there is no change in rank.

In the above embodiment, the server 30 delivers to each user the first evaluation information and the second evaluation information indicating his or her ranks. However, the present disclosure is not limited to this, and the ranking list (i.e., information indicating the ranks of all the users belonging to the target group) may be delivered to each user instead of or in addition to his or her ranks.

In the VGI system 1 according to the above embodiment, the server 30 evaluates the user. However, the system configuration may be changed so that the vehicle 50 evaluates the user instead of the server 30. For example, each vehicle 50 may give the user a score (grade) and send the user's score to the server 30, and the server 30 may rank the users based on the received scores of the users and send back to each user his or her rank. Each vehicle 50 may also rank the user in addition to giving him or her a score. For example, each electric vehicle included in the VGI system may have a configuration shown in FIG. 12.

One electric vehicle (hereinafter referred to as the "target vehicle") included in a VGI system according to a modification will be described with reference to FIGS. 12 and 13. In the following description, the electric vehicles included in the VGI system other than the target vehicle are referred to as "other vehicles."

Figure 12:
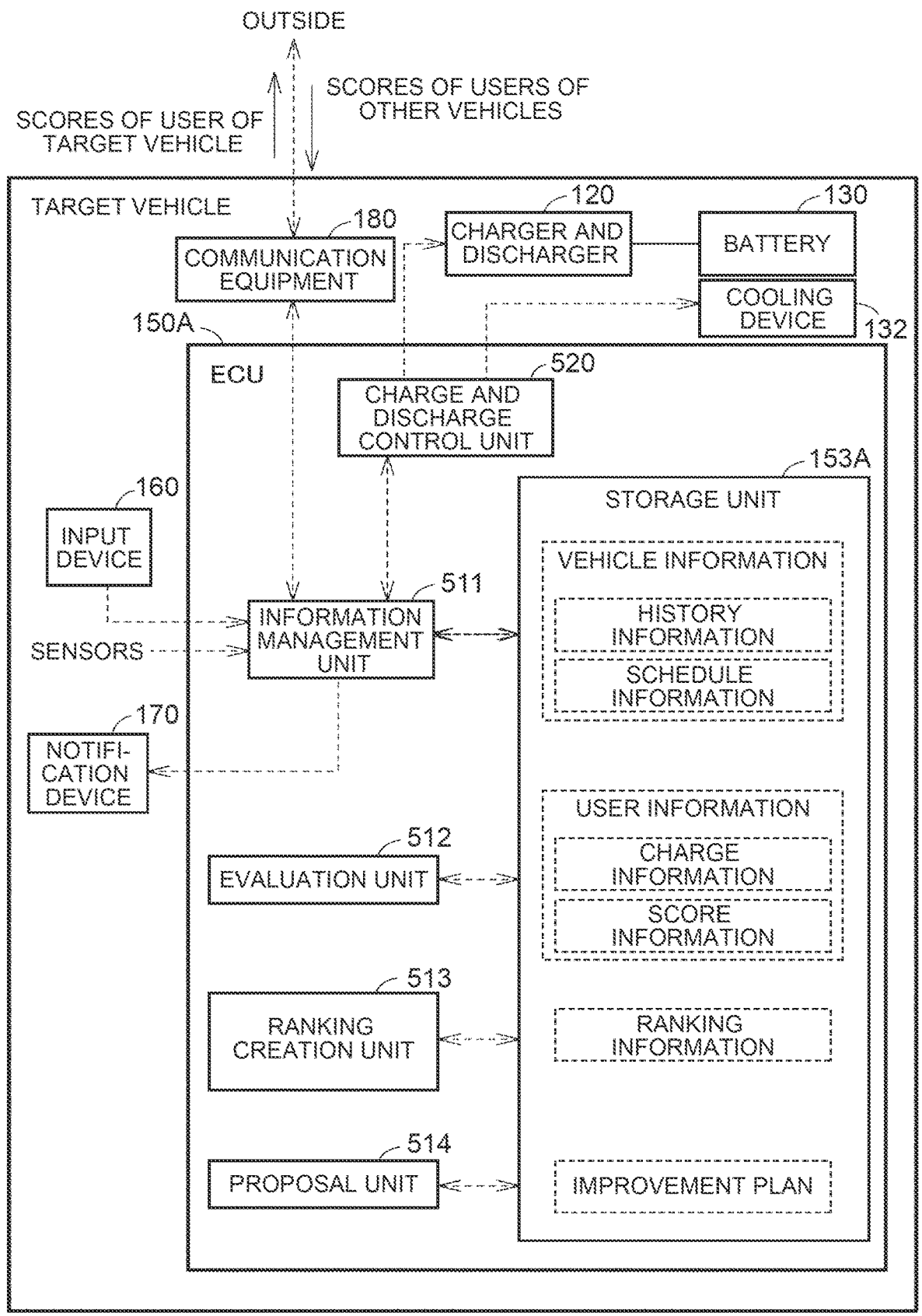
FIG. 12 illustrates a modification of the configuration of the vehicle control device shown in FIG. 3.

FIG. 12 illustrates a modification of the configuration of the vehicle control device (ECU) shown in FIG. 3. Referring to FIG. 12, although the target vehicle basically has the same configuration as the vehicle 50 according to the above embodiment, the target vehicle includes an ECU 150A instead of the ECU 150 shown in FIG. 3. The ECU 150A includes a processor, not shown, and a storage device 153A. The ECU 150A further includes an information management unit 511, an evaluation unit 512, a ranking creation unit 513, a proposal unit 514, and a charge and discharge control unit 520. Each of these units is embodied by the processor and programs that are executed by the processor (e.g., programs stored in the storage device 153A).

The information management unit 511 is configured to acquire the state of the target vehicle (e.g., charging power, feeding power, and the SOC of the battery 130) using the outputs of various sensors mounted on the target vehicle and record the charging history and the power feeding history of the target vehicle on the storage device 153A. The information management unit 511 is configured to save the travel schedule of the target vehicle in the storage device 153A. The evaluation unit 512 is configured to calculate scores (e.g., the charging scores X, Y and the power feeding scores X, Y) of the user of the target vehicle using the history information of the target vehicle and save the calculated scores in the storage device 153A. The information management unit 511 is configured to send the scores calculated by the evaluation unit 512 (e.g., the charging scores X, Y and the power feeding scores X, Y of the user of the target vehicle) together with the vehicle ID of the target vehicle to the outside (e.g., the server 30 or other vehicles). The information management unit 511 is configured to receive the scores of the users of other vehicles together with their vehicle IDs and save the received scores in association with the vehicle IDs in the storage device 153A. The storage device 153A manages the vehicle information based on the vehicle IDs. The scores of the users of the other vehicles (and their vehicle IDs) may be sent from the server 30 or the other vehicles to the target vehicle. The ranking creation unit 513 creates ranking information indicating the ranks of the user of the target vehicle for the way of performing external charging and the way of performing external power feeding (e.g., the ranks of the charging scores X, Y and the power feeding scores X, Y) by using the scores of the user of the target vehicle and the scores of the users of the other vehicles. The ranking creation unit 513 saves the created ranking information in the storage device 153A. The information management unit 511 is configured to control the notification device 170 to present the ranking information created by the ranking creation unit 513 to the user.

Since the proposal unit 514 and the charge and discharge control unit 520 of the ECU 150A basically have the same functions as the proposal unit 304 and the charge and discharge control unit 502 (FIG. 3) described above, description thereof will be omitted.

FIG. 13 is a flowchart of an information presentation method that is performed by the vehicle control device (ECU) shown in FIG. 12. The process illustrated in this flowchart is repeated in predetermined cycles.

Referring to FIG. 13 together with FIG. 12, in S31, the vehicle control device (ECU) determines whether the information management unit 511 has received the scores of the user of any other vehicle. S31 is repeated as long as the information management unit 511 receives the scores of the user of any other vehicle (as long as the determination result in S31 is NO).

When the information management unit 511 receives the scores of the user of any other vehicle (YES in S31), the information management unit 511 saves the received information (e.g., the charging scores X, Y and the power feeding scores X, Y of the user(s) of other vehicle(s)) in the storage device 153A in S32. The routine then proceeds to S33, and S33, S34, and S35 are performed in this order.

In S33, the evaluation unit 512 calculates the scores (e.g., the charging scores X, Y and the power feeding scores X, Y) of the user of the target vehicle using the history information of the target vehicle, and saves the calculated scores in the storage device 153A.

In S34, the ranking creation unit 513 creates ranking information indicating the ranks of the user of the target vehicle (e.g., the first battery degradation ranking, the second battery degradation ranking, the first VPP ranking, and the second VPP ranking), and the proposal unit 514 creates an improvement plan or a praise message for the user of the target vehicle.

In S35, the information management unit 511 controls the notification device 170 to notify the user of the ranking information and the improvement plan (or the praise message). When S35 ends, the routine returns to the first step (S31).

The target vehicle according to the above modification functions as an information presentation device. With this information presentation device as well, the user can check whether his or her way of performing external charging and external power feeding is better or worse than other users.

The ranking list in descending order of score is used in the above embodiment and modification. However, the present disclosure is not limited to this, and a ranking list in ascending order of score may be used. The target group (i.e., the group to be ranked) is not limited to the whole group and the vehicle model group and can be set as desired. For example, only either the whole group or the vehicle model group may be used as the target group, or other group(s) may be used as the target group(s) instead of or in addition to the whole group and the vehicle model group. The users may be grouped by their years of registration and/or driving history (e.g., years of driving experience and the number of violations).

In the above embodiment and modification, the ranks are presented as the evaluation information (evaluation results) indicating how high the user's scores are. However, the ranks need not necessarily be presented, and only the numbers of points (e.g., the cumulative numbers of points or the averages of points per unit period) may be presented. For example, the scores of the user may be presented by predetermined categories such as good, fair, and bad. The scores of the user may be presented by categories such as high, average, and low in comparison with the scores of other user(s) (e.g., a predetermined rival user(s)).

The criteria for evaluating the way of performing external charging may include charges related to external charging (e.g., either or both of electricity charges for external charging and the amount of incentives received from external charging). The criteria for evaluating the way of performing external feeding may include charges related to external feeding (e.g., the amount of incentives received from external feeding). In the above embodiment and modification, scores are given for each of the way of performing external charging and the way of performing external power feeding according to the plurality of criteria. However, scores may be given according to a single criterion. The first evaluation information regarding external charging may indicate the score that is higher for the user who performs external charging while giving more consideration to the life of the electrical storage device (e.g., the battery 130). The first evaluation information regarding external charging may indicate the score that is higher for the user who performs external charging while giving more consideration to associated charges (e.g., electricity charges and incentives). The first evaluation information regarding external charging may indicate the score that is higher for the user who performs external charging so as to contribute more to the balancing of supply and demand on the power network. The second evaluation information regarding external power feeding may indicate the score that is higher for the user who performs external power feeding while giving more consideration to the life of the electrical storage device (e.g., the battery 130). The second evaluation information regarding external power feeding may indicate the score that is higher for the user who performs external charging while giving more consideration to associated charges (e.g., incentives). The second evaluation information regarding external power feeding may indicate the score that is higher for the user who performs external power feeding so as to contribute more to the balancing of supply and demand on the power network.

In the above embodiment and modification, both the first evaluation information regarding external charging and the second evaluation information regarding external power feeding are sent to each user. However, the present disclosure is not limited to this, and only either the first evaluation information or the second evaluation information may be sent to each user. The proposal units 304, 514 may be omitted.

The configuration of the vehicle is not limited to that shown in FIG. 1. For example, in the configuration shown in FIG. 1, a charging device capable of performing only external charging or a power feeding device capable of performing only external power feeding may be used instead of the charger and discharger 120. The vehicle may be configured so that it can be charged in a non-contact manner. The vehicle is not limited to a passenger car, and may be a bus or a truck.

The embodiment disclosed herein should be considered illustrative in all respects, and not restrictive. The scope of the disclosure is defined by the claims rather than by the above description of the embodiment, and is intended to include all modifications that fall within the scope of the claims or the equivalents thereof.

What is claimed is:

1. An information presentation system comprising an electric vehicle, the electric vehicle including an electrical storage device and being configured to perform either or both of external charging in which the electrical storage device is charged with electric power supplied from an outside of the electric vehicle and external power feeding in which electric power is supplied from the electrical storage device to the outside, wherein:

a user of the electric vehicle is evaluated using information acquired from the electric vehicle;

an evaluation result is sent to the user that has been evaluated;

the evaluation result includes either or both of first evaluation information indicating how high a score of the user for the external charging is and second evaluation information indicating how high a score of the user for the external power feeding is;

the score of each of users of a plurality of the electric vehicles for the external charging is calculated using history information acquired from each of the electric vehicles;

the users of the electric vehicles are ranked in descending or ascending order of the calculated score; and the first evaluation information indicating at least a rank of the user among the users who have been ranked is sent to the user of the electric vehicle.

2. The information presentation system according to claim 1, wherein:
the evaluation result includes the first evaluation information; and
the first evaluation information indicates a score that is higher for the user who performs the external charging while giving more consideration to a life of the electrical storage device.

3. The information presentation system according to claim 1, wherein either or both of the first evaluation information and the second evaluation information indicate a score that is higher for the user whose contribution to balancing of supply and demand on a power network is greater.

4. The information presentation system according to claim 1, wherein:
the evaluation result includes the first evaluation information;
the first evaluation information indicates scoring of a user's way of performing the external charging according to a plurality of criteria; and
the criteria include either or both of degradation of the electrical storage device due to the external charging and contribution to balancing of supply and demand on a power network by the external charging.

5. The information presentation system according to claim 1, wherein:
the second evaluation information indicating at least a rank of the user among the users who have been ranked is sent to the user of the electric vehicle.

6. The information presentation system according to claim 1, wherein the score is represented by at least one of the number of points, a predetermined category, and a rank in a predetermined group including a plurality of the users.

7. The information presentation system according to claim 1, wherein the evaluation result is sent to the user that has been evaluated through a mobile terminal.

8. A server comprising a processor configured to:
evaluate each of users of a plurality of electric vehicles using information acquired from each of the electric vehicles; and
send evaluation results to each of the users that has been evaluated, wherein
each of the electric vehicles includes an electrical storage device and is configured to perform either or both of external charging in which the electrical storage device is charged with electric power supplied from an outside of each of the electric vehicles and external power feeding in which electric power is supplied from the electrical storage device to the outside,
the evaluation results include either or both of first evaluation information indicating how high a score of the user for the external charging is and second evaluation information indicating how high a score of the user for the external power feeding is,
the score of each of users of a plurality of the electric vehicles for the external charging is calculated using history information acquired from each of the electric vehicles,
the users of the electric vehicles are ranked in descending or ascending order of the calculated score, and
the first evaluation information indicating at least a rank of the user among the users who have been ranked is sent to the user of the electric vehicle.

9. The server according to claim 8, wherein the processor is configured to send the evaluation results to each of the users that has been evaluated through a mobile terminal.

10. An information presentation method comprising:
evaluating by a processor each of users of a plurality of electric vehicles using information acquired from each of the electric vehicles; and
sending evaluation results from the processor to each of the users that has been evaluated, wherein
each of the electric vehicles includes an electrical storage device and is configured to perform either or both of external charging in which the electrical storage device is charged with electric power supplied from an outside of each of the electric vehicles and external power feeding in which electric power is supplied from the electrical storage device to the outside,
the evaluation results include either or both of first evaluation information indicating how high a score of the user for the external charging is and second evaluation information indicating how high a score of the user for the external power feeding is,
the score of each of users of a plurality of the electric vehicles for the external charging is calculated using history information acquired from each of the electric vehicles,
the users of the electric vehicles are ranked in descending or ascending order of the calculated score, and
the first evaluation information indicating at least a rank of the user among the users who have been ranked is sent to the user of the electric vehicle.

11. The information presentation method according to claim 10, further comprising sending the evaluation results from the processor to each of the users that has been evaluated through a mobile terminal.

12. An information presentation device comprising a processor configured to:
send history information of an electric vehicle to an outside of the information presentation device;
receive information indicating how high a score calculated using the history information is;
output, by using the received information, either or both of first evaluation information indicating how high a score of a user for external charging is and second evaluation information indicating how high a score of the user for external power feeding is; and
send either or both of the first evaluation information indicating how high the score of the user for external charging is and the second evaluation information indicating how high the score of the user for external power feeding is to a mobile terminal.

13. An information presentation device comprising a processor configured to:
calculate a score of a user of a target vehicle using history information of the target vehicle, the target vehicle being an electric vehicle;
send the score of the user of the target vehicle to an outside of the information presentation device;
receive scores of users of other vehicles that are electric vehicles other than the target vehicle; and
output a rank of the user of the target vehicle regarding either or both of a way of performing external charging and a way of performing external power feeding by using the score of the user of the target vehicle and the scores of the users of the other vehicles.

14. The information presentation device of claim 13, wherein the outside of the information presentation device is a mobile terminal.

\* \* \* \* \*